United States Patent
Lee et al.

(10) Patent No.: US 10,928,666 B2
(45) Date of Patent: Feb. 23, 2021

(54) DISPLAY DEVICE

(71) Applicant: SAMSUNG ELECTRONICS CO., LTD., Suwon-si (KR)

(72) Inventors: Young Chol Lee, Hwaseong-si (KR); Wook-Jae Jeon, Hwaseong-si (KR); Il Yong Jung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/164,923

(22) Filed: Oct. 19, 2018

(65) Prior Publication Data

US 2019/0121174 A1    Apr. 25, 2019

(30) Foreign Application Priority Data

Oct. 19, 2017  (KR) .................. 10-2017-0135561

(51) Int. Cl.
*G02F 1/1335*    (2006.01)
*G02B 5/22*      (2006.01)

(52) U.S. Cl.
CPC ...... *G02F 1/1335* (2013.01); *G02F 1/133528* (2013.01); *G02B 5/223* (2013.01); *G02F 2001/133507* (2013.01); *G02F 2001/133562* (2013.01); *G02F 2001/133567* (2013.01);
(Continued)

(58) Field of Classification Search
CPC ..... G02F 2001/133507; G02F 2202/28; G02B 5/223

See application file for complete search history.

(56) References Cited

U.S. PATENT DOCUMENTS 9,915,767 B2   3/2018  You et al.
2006/0290253 A1*  12/2006  Yeo .................. G02B 5/0278
                                                       313/116
(Continued)

FOREIGN PATENT DOCUMENTS

JP    2008233824 A   * 10/2008
JP    2015-052796 A    3/2015
(Continued)

OTHER PUBLICATIONS

International Search Report dated Feb. 14, 2019, issued by the International Searching Authority in International Application No. PCT/KR2018/011918 (PCT/ISA/210).
(Continued)

*Primary Examiner* — Michael H Caley
*Assistant Examiner* — Jonathan Y Jung
(74) *Attorney, Agent, or Firm* — Sughrue Mion, PLLC

(57) ABSTRACT

Provided is a display device with enhanced uniformity of brightness. The display device includes a display panel, and a backlight unit configured to supply light to the display panel, wherein the display panel includes a liquid crystal panel with first and second surfaces opposite to each other, a first polarizing plate arranged on the first surface of the liquid crystal panel, a second polarizing plate arranged on the second surface of the liquid crystal panel, a light absorbing layer arranged on the second polarizing plate to absorb a portion of the light supplied from the backlight unit, and a light absorbing material included in the light absorbing layer to absorb light of particular wavelengths.

15 Claims, 23 Drawing Sheets

(52) U.S. Cl.
CPC ...... *G02F 2201/08* (2013.01); *G02F 2202/02* (2013.01); *G02F 2202/28* (2013.01)

(56) References Cited

U.S. PATENT DOCUMENTS

| | | | |
|---|---|---|---|
| 2007/0153377 A1* | 7/2007 | Goto | G02F 1/133524 359/460 |
| 2009/0091824 A1* | 4/2009 | Yamashita | G02B 5/0242 359/453 |
| 2010/0214506 A1* | 8/2010 | Gaides | G02B 5/0263 349/61 |
| 2010/0315716 A1* | 12/2010 | Wang | G02B 5/02 359/599 |
| 2011/0286222 A1* | 11/2011 | Coleman | G02B 6/0036 362/326 |
| 2017/0044312 A1* | 2/2017 | Kato | C08G 63/64 |
| 2017/0139094 A1 | 3/2017 | You et al. | |
| 2017/0153363 A1* | 6/2017 | Lee | G02F 1/133606 |
| 2018/0128959 A1* | 5/2018 | Kashiwagi | G02F 1/133524 |

FOREIGN PATENT DOCUMENTS

| | | |
|---|---|---|
| JP | 2015-121792 A | 7/2015 |
| JP | 2017-167506 A | 9/2017 |
| KR | 10-2009-0121007 A | 11/2009 |
| KR | 10-2010-0104380 A | 9/2010 |
| KR | 10-2017-0056083 A | 5/2017 |

OTHER PUBLICATIONS

Communication dated Oct. 1, 2020 issued by the European Patent Office in European Application No. 18868330.4.

* cited by examiner

DISPLAY DEVICE

CROSS-REFERENCE TO RELATED APPLICATION

This application is based on and claims priority under 35 U.S.C. § 119 to Korean Patent Application No. 10-2017-0135561, filed on Oct. 19, 2017, in the Korean Intellectual Property Office, the disclosure of which is incorporated herein by reference in its entirety.

BACKGROUND

1. Field

The disclosure relates to a display device, and more particularly, to a display device with enhanced uniformity of brightness.

2. Description of Related Art

Display devices are a kind of output device for visually providing data information such as characters, figures, etc., and still or video images.

The display device may include an active light-emitting display panel such as organic light emitting diodes (OLEDs) or a passive light-emitting display panel such as liquid crystal displays (LCDs).

A display device employing the passive light-emitting display panel may include a backlight unit for supplying light to the display panel.

The display device with the passive light-emitting display panel has difficulty in realizing a pure black screen, because some light leaks out of the light source of the backlight unit that is always turned on.

SUMMARY

Provided is a display device with an enhanced structure to facilitate realization of black screens.

Provided is a display device with an enhanced structure to prevent mura.

Provide is a display device having high color reproducibility.

In accordance with an aspect of the disclosure, there is provided a display device including a display panel, and a backlight unit configured to supply light to the display panel, wherein the display panel includes a liquid crystal panel including a first surface and a second surface, the second surface that is opposite to the first surface, a first polarizing plate provided on the first surface of the liquid crystal panel, a second polarizing plate provided on the second surface of the liquid crystal panel, a light absorbing layer provided on the second polarizing plate, the light absorbing layer configured to absorb a portion of the light supplied from the backlight unit, and a light absorbing material included in the light absorbing layer and configured to absorb light of predetermined wavelengths.

The light absorbing layer may further include a first resin layer, a second resin layer having a refractive index that is higher than a refractive index of the first resin layer, and light absorbers provided on the first resin layer and configured to absorb a portion of light passing the light absorbing layer, and wherein the light absorbing material is included in at least one from among the first resin layer, the second resin layer, and the light absorbers.

The first resin layer may include an optical surface facing the second polarizing plate, and a plurality of grooves provided on the optical surface, and wherein the light absorbers are provided in the plurality of grooves and fill at least a part of each of the plurality of grooves.

The display panel may further include an adhesion layer provided between the light absorbing layer and the second polarizing plate and configured to bond the light absorbing layer and the second polarizing plate.

The adhesion layer may have a refractive index that is the same as or lower than a refractive index of the first resin layer or may have a refractive index lower than the refractive index of the first resin layer.

The light absorbers may include black resin.

The light absorbers may include at least one of carbon black, graphite powder, gravure ink, black spray, and black enamel.

The light absorbing material may include at least one pigment configured to absorb light of the predetermined wavelengths.

In accordance with an aspect of the disclosure, there is provided a display device including a display panel, and a backlight unit configured to supply light to the display panel, wherein the display panel includes a liquid crystal panel including a first surface and a second surface that is opposite to the first surface, a first polarizing plate provided on the first surface of the liquid crystal panel, a second polarizing plate provided on the second surface of the liquid crystal panel, a light absorbing layer provided on the second polarizing plate, the light absorbing layer including a first resin layer and a second resin layer having a refractive indexes that is different than a refractive index of the first resin layer, and light absorbers provided on the first resin layer and configured to absorb a portion of light passing the light absorbing layer, and a light absorbing material included in at least one from among the first resin layer, the second resin layer, and the light absorbers and configured to absorb light of predetermined wavelengths.

The refractive index of the first resin layer may be lower than the refractive index of the second resin layer.

The first resin layer may include an optical surface facing the second polarizing plate, and a plurality of grooves provided on the optical surface, and wherein the light absorbers are provided in the plurality of grooves and fill at least part of each of the plurality of grooves.

The light absorbers may include black resin.

The light absorbers may include at least one of carbon black, graphite powder, gravure ink, black spray, and black enamel.

The light absorbing material may include at least one pigment configured to absorb light of the predetermined wavelengths.

In accordance with an aspect of the disclosure, there is provided a display device including a display panel, and a backlight unit configured to supply light to the display panel, wherein the display panel includes a liquid crystal panel, a first polarizing plate provided on the liquid crystal panel, a second polarizing plate provided on the liquid crystal panel opposite to the first polarizing plate, a light absorbing layer provided on the second polarizing plate, the light absorbing layer being configured to absorb light inclined at more than a predetermined angle from a baseline extending in a front-back direction of a surface of the display panel among light incident on the light absorbing layer, and a light absorbing material included in the light absorbing layer and configured to absorb light of predetermined wavelengths.

The light absorbing layer may include a first resin layer, a second resin layer having a refractive index higher than a refractive index of the first resin layer, and light absorbers provided on the first resin layer, wherein the light absorbing material is included in at least one from among the first resin layer, the second resin layer, and the light absorbers.

The first resin layer may include an optical surface provided on the second polarizing plate, and a plurality of grooves provided on the optical surface, and wherein the light absorbers are provided in the plurality of grooves and fill at least part of each groove.

The light absorbers may include at least one of carbon black, graphite powder, gravure ink, black spray, and black enamel.

The light absorbing material may include at least one pigment configured to absorb light of the predetermined wavelengths.

The cross-section of each of the plurality of grooves may have at least one of a form of trapezoid, triangle, rectangle, partial circles, half circles, ovals, and any combination.

The light absorbers filled in the plurality of grooves may be elongated in a horizontal direction of the display panel, or may be elongated to cross in the horizontal direction and a vertical direction of the display panel.

The light absorbers filled in the plurality of grooves may be provided in dots on the first optical surface.

The display device, wherein distances between each of the light absorbers may be uniform.

The display device, wherein distances between each of the light absorbers in a first section of the optical surface may be uniform, and distances between each of the light absorbers in a second section of the optical surface may be non-uniform.

BRIEF DESCRIPTION OF THE DRAWINGS

The above and other aspects, features and advantages of certain embodiments of the present disclosure will become more apparent from the following description taken in conjunction with the accompanying drawings, in which.

DETAILED DESCRIPTION OF EXEMPLARY EMBODIMENTS

Figure 1:
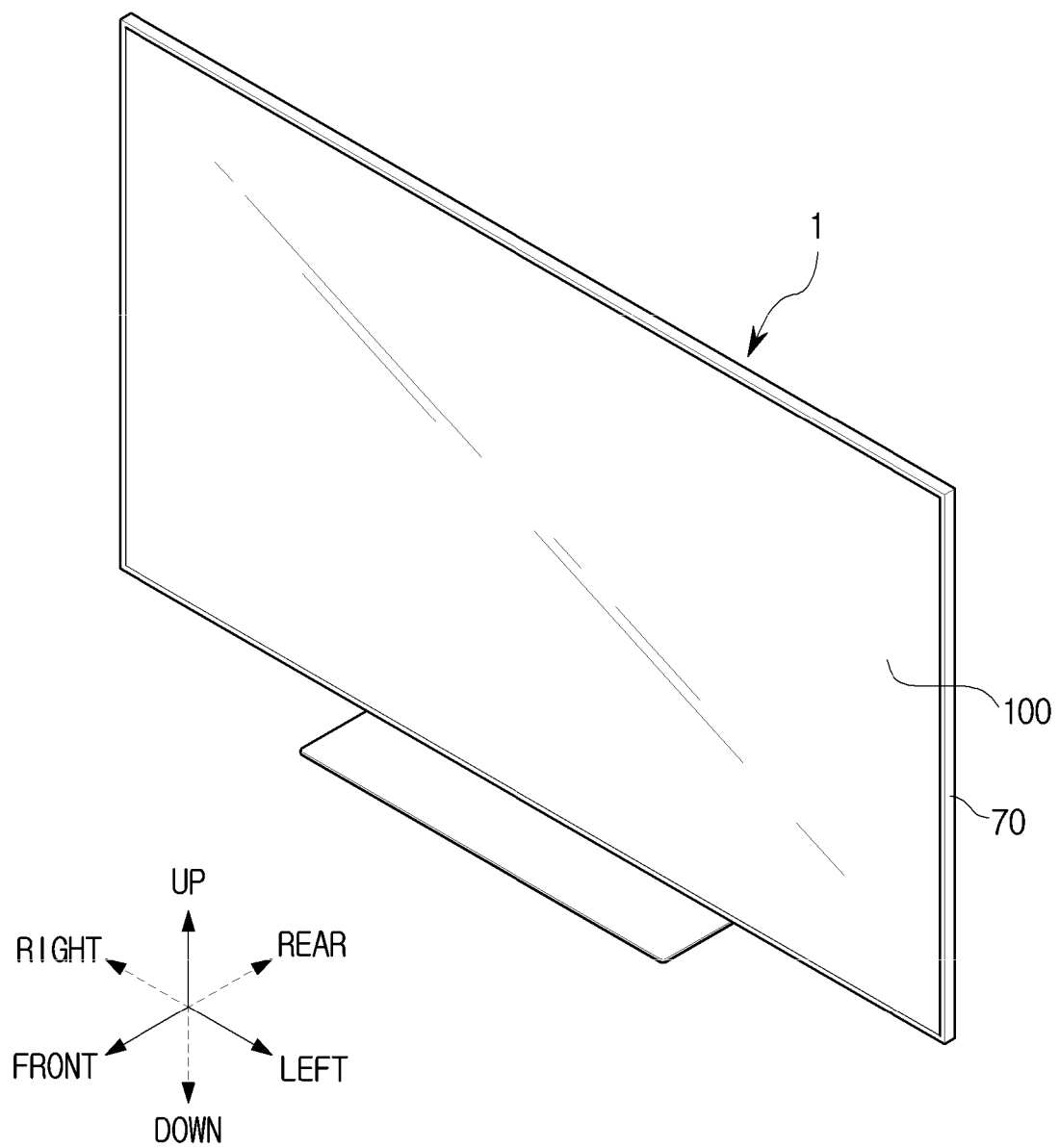
FIG. 1 is a perspective view of a display device according to an embodiment.

Reference will now be made in detail to embodiments, examples of which are illustrated in the accompanying drawings, wherein like reference numerals refer to the like elements throughout. The terms "front", "rear", "upper", "lower", "top", and "bottom" as herein used are defined based on the drawings, but the terms may not restrict the shape and position of the respective components.

As used herein, the terms "1st" or "first" and "2nd" or "second" may use corresponding components regardless of importance or order and are used to distinguish one component from another without limiting the components.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The terms used throughout the specification are merely used to describe particular embodiments, and are not intended to limit the present disclosure. Also, it is to be understood that the terms such as "include", "have", or the like, are intended to indicate the existence of the features, numbers, operations, components, parts, ingredients, materials, or combinations thereof disclosed in the specification, and are not intended to preclude the possibility that one or more other features, numbers, operations, components, parts, ingredients, materials, or combinations thereof may exist or may be added.

In the drawings, diameters, lengths or thicknesses may be enlarged or reduced to clearly illustrate various components, layers, and regions. Like reference numerals in the drawings denote like elements. It will also be understood that when an element such as a layer, a region or a substrate is referred to as being "on" or "arranged on" another element, it can be directly on the other element, or intervening elements may also be present.

Also, in this specification, the term "front surface" is defined based on the surface of a display panel on which images are displayed in a display device, and the terms "back surface" and "rear surface" are defined based on a surface opposite to the front surface.

Figure 2:
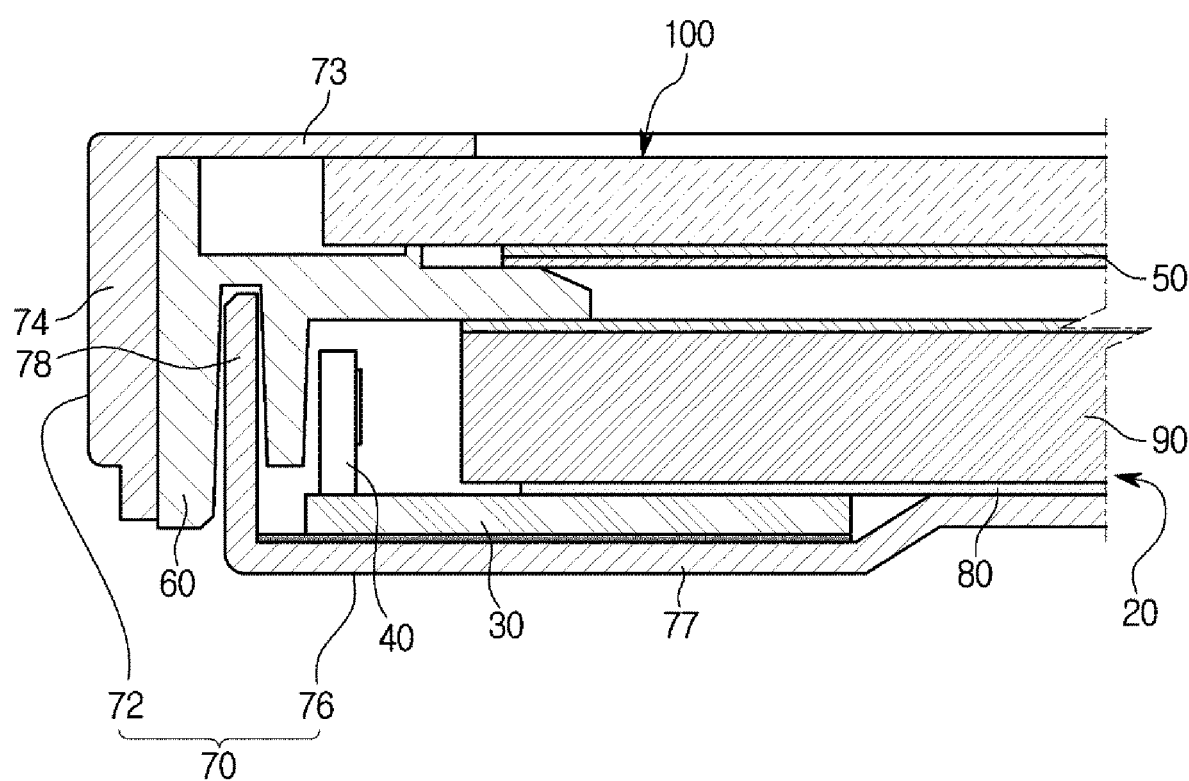
FIG. 2 is a cross-sectional view of a display device according to an embodiment.

FIG. 1 is a perspective view of a display device according to an embodiment, and FIG. 2 is a cross-sectional view of a display device according to an embodiment.

A display device 1 may include a display module for displaying an image.

The display module may include a display panel 100 on which an image is displayed, and a backlight unit (BLU) 20 provided to supply light to the display panel 100.

The BLU 20 may include a printed circuit board 30, a light source module 40, a light guide plate 90, and an optical sheet 50. The light source module 40 may be arranged in the back of the display panel 100. The light guide plate 90 serves to transmit light emitted from the light source module 40 to the display panel 100. The light guide plate 90 may be arranged in the back of the display panel 100 to face the light source module 40. The optical sheet 50 may be arranged between the display panel 100 and the light guide plate 90 to change the optical property of the light emitted from the light source module 40.

The display device 1 may further include a middle mold 60 to support the display panel 100, and a display chassis 70 to form the exterior of the display device 1. The display chassis 70 may include a top chassis 72 coupled to the front of the middle mold 60 to keep the display panel 100 in the state of being installed in the middle mold 60, and a bottom chassis 76 coupled to the back of the middle mold 60 and having the light source module 40 mounted thereon.

The light source module 40 may be arranged on the front of the bottom chassis to be able to irradiate light to the display panel 100. The light source module 40 may include, for example, point light sources for emitting monochromatic light or white light.

The display panel 100 and the top chassis 72 may be installed one after another in front of the middle mold 60, and the bottom chassis 76 may be installed behind the middle mold 60. The middle mold 60 not only supports the display panel 100, top chassis 72, and bottom chassis 76, but also maintains a distance between the display panel 100 and the bottom chassis 76.

The top chassis 72 may include a bezel part 73 covering the front edge of the display panel 100, and a top side 74 bending backward from an end of the bezel part 73 and covering the side of the middle mold 60.

The bottom chassis 76 may include a rear part 77 forming the rear side of the display device 1, and a bottom side 78 extending forward from around the rear part 77 to be coupled into the middle mold 60. The bottom chassis 76 may have the form of a polygonal plate with higher solidity, and may include, for example, a metal substance e.g., aluminum, aluminum alloy, etc. having less thermal deformation from the heat generated by at least one of the light source module 40 installed and the display panel 100. The bottom chassis 76 may be molded from, for example, plastics e.g., polycarbonate (PC) or from plastics with glass fiber added thereto.

The printed circuit board 30 may be arranged on the bottom chassis 76. A plurality of light source modules 40 may be mounted on the printed circuit board 30. The size of the printed circuit board 30 may correspond to the size of the display panel 100. The plurality of light source modules 40 may be arranged in multiple arrays on the printed circuit board 30. The plurality of light source modules 40 may be arranged in a planar array on the printed circuit board 30. The light source module 40 will be described later.

The BLU 20 may further include a reflecting sheet 80. The reflecting sheet 80 reflects some of the light emitted from the light source module 40, which reflects or bounces off the optical sheet 50 or the display panel 100, back to the display panel 100. The reflecting sheet 80 may be arranged in front of the printed circuit board 30 to reflect light leakage toward the display panel 100, thereby enhancing light efficiency. The reflecting sheet 80 may be located between the light guide plate 90 and the bottom chassis 76. The reflecting sheet 80 may be coated with higher reflective white or silver-colored coating agents, e.g., silver, $TiO_2$. The reflecting sheet 80 may include a reflecting plate.

The optical sheet 50 may allow the light emitted from the light source module 40 toward the display panel 100 to have higher uniformity in brightness. The light with a more uniform brightness, which has passed the optical sheet 50, is incident on the display panel 100. The optical sheet 50 may include at least one of a protective sheet, a prism sheet, or a diffusion sheet. The BLU 20 may include one or more optical sheets 50.

While the display device 1 as described above is a flat display device as an example, the display device 1 may include not only the flat display device but also a curved display device with a curved surface, a bendable display device with variable screen curvature, and any other display device with various forms.

Furthermore, while an edge-type display device has been focused and described above, the display device 1 may include not only the edge-type display device but a direct-type display device.

Figure 3:
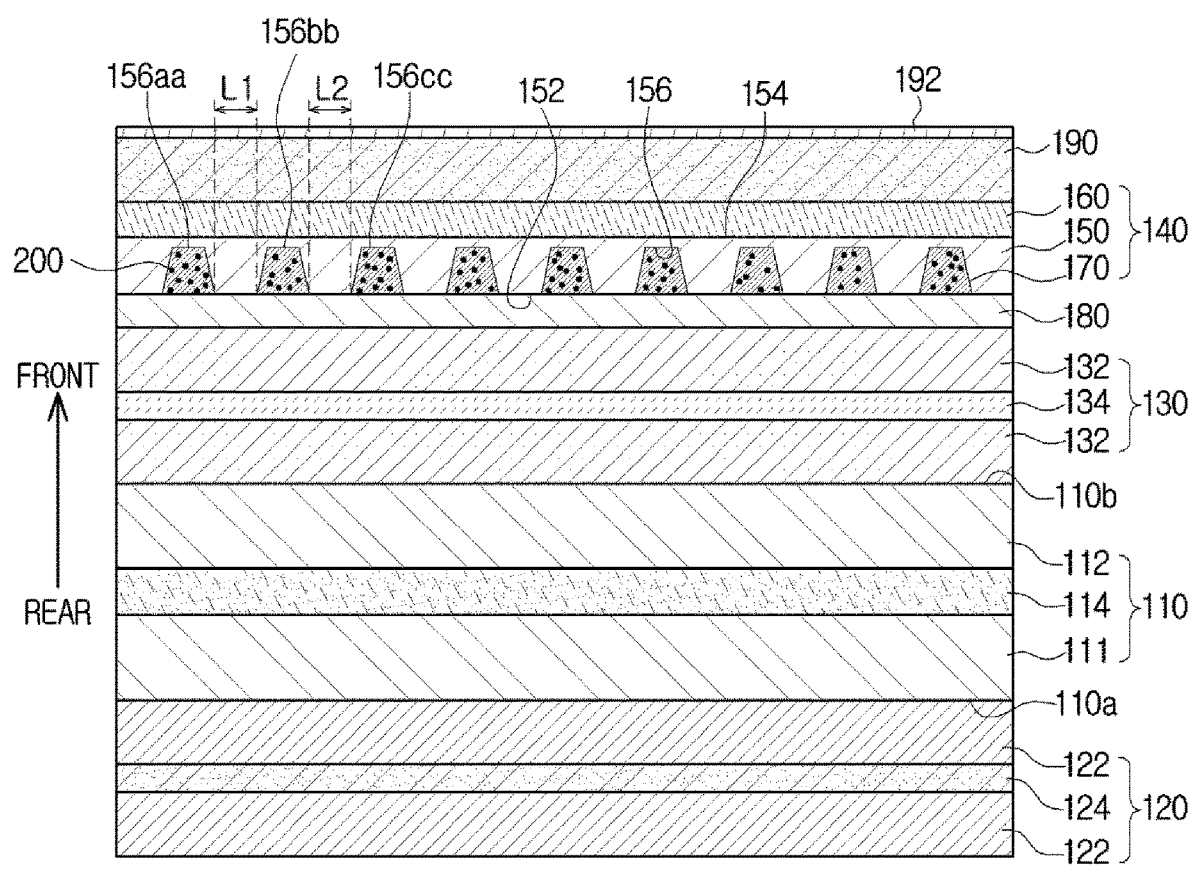
FIG. 3 is a cross-sectional view of a display panel of a display device according to an embodiment.
Figure 4:
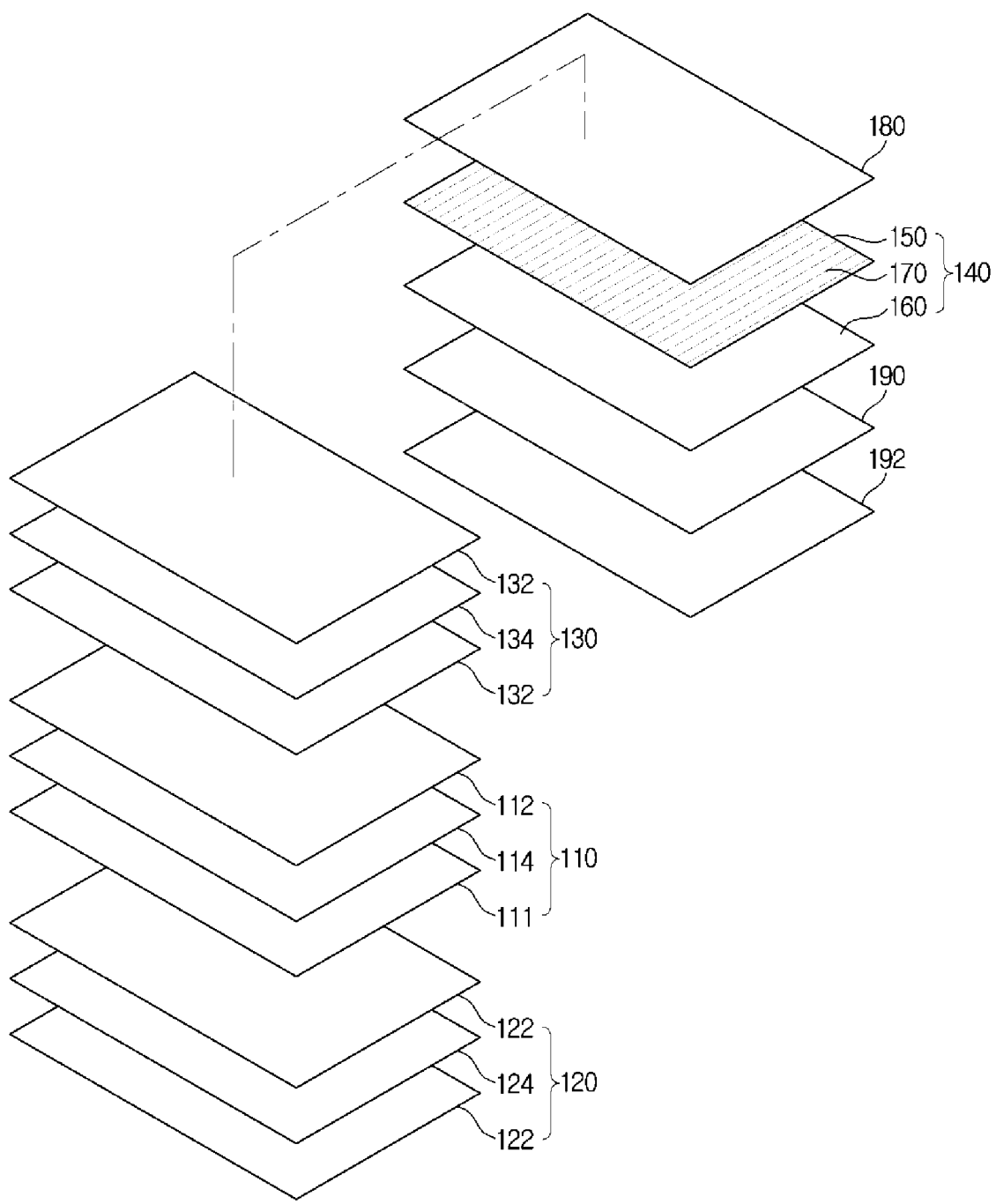
FIG. 4 is an exploded perspective view of a display panel of a display device according to an embodiment.

FIG. 3 is a cross-sectional view of a display panel of a display device according to an embodiment, and FIG. 4 is an exploded perspective view of a display panel of a display device according to an embodiment. FIGS. 5 to 11 show a display device having different display panels, each having a different array of a light absorbing material according to an embodiment.

As shown in FIGS. 3 to 11, the display unit 100 may display image by converting an electric signal to an optical signal. The display panel 100 may include a liquid crystal panel 110, and a plurality of polarizing plates 120 and 130.

The liquid crystal panel 110 is arranged in front of the BLU 20 for blocking or transmitting the light emitted from the BLU 20.

The front surface of the liquid crystal panel 110 may form a screen of the display device 1. The liquid crystal panel 110 may be made up of a plurality of pixels. Each of the plurality of pixels included in the liquid crystal panel 110 may separately block or transmit the light from the BLU 20. The light transmitted through the plurality of pixels may form an image displayed on the display device 1.

The liquid crystal panel 110 may include a first transparent substrate 111, a second transparent substrate 112, and a liquid crystal layer 114. The liquid crystal panel 110 may further include pixel electrodes, thin film transistors (TFTs), a common electrode, and color filters. The first and second transparent substrates 111 and 112 may form the exterior of the liquid crystal panel 110, and protect the liquid crystal layer 114 and color filter arranged between the first and second transparent substrates 111 and 112. The first and second transparent substrates 111 and 112 may be made of tempered glass or transparent resin.

The liquid crystal is in an intermediate state between solid (crystal) and fluid. When heat is applied to ordinary materials, the materials are phase-changed from a solid state to a transparent liquid state at a temperature above their melting points. By contrast, when heat is applied to a liquid crystal substance in a solid state, the liquid crystal substance changes to an opaque and muddy liquid and then into a transparent liquid state. Most liquid crystal materials are organic compounds, the molecules of which are shaped like thin and long rods, and the arrangement of the molecules are irregular in a direction and regular in another direction. As a result, the liquid crystal has both fluidity of a liquid and optical anisotropy of a crystal (solid).

Furthermore, the liquid crystal reveals an optical property according to a change in electric field. For example, the direction in which the molecules of the liquid crystal are arranged may be changed according to a change in electric field.

When an electric field is produced in the liquid crystal layer 114, the liquid crystal molecules of the liquid crystal layer 114 are arranged along the direction of the electric field, and when no electric field is produced in the liquid crystal layer 114, the liquid crystal molecules may be arranged irregularly or arranged along the alignment layer.

Consequently, the optical property of the liquid crystal layer 114 may be changed according to whether there is an electric field produced to the liquid crystal layer 114. For example, if no electric field is produced in the liquid crystal layer 114, the light polarized by the first polarizing plate 120 may penetrate the liquid crystal layer 114 and then the second polarizing plate 130 due to the arrangement of the liquid crystal molecules of the liquid crystal layer 114. When an electric field is produced in the liquid crystal layer 114, the light polarized by the first polarizing plate 120 may not penetrate the second polarizing plate 130 due to being blocked by the changed arrangement of the liquid crystal molecules of the liquid crystal layer 114.

The plurality of polarizing plates 120 and 130 may be arranged on the first and second transparent substrates 111 and 112 of the liquid crystal layer 114.

The plurality of polarizing plates 120 and 130 may include the first polarizing plate 120 arranged on the rear side of the first transparent substrate 111, and the second polarizing plate 130 arranged on the front side of the second transparent substrate 112.

The first polarizing plate 120 may be arranged on a first surface 110a of the liquid crystal panel 110. For example, the first polarizing plate 120 may be arranged to be in contact with the first surface 110a of the liquid crystal panel 110. The first polarizing plate 120 may include a first protective film 122 and a first polarizing film 124. The first protective film 122 may be formed of a durable and non-optical material. For example, the first protective film 122 may include at least one of tri-acetyl cellulose (TAC), polyethylene terephthalate (PET), and acrylic films, but are not limited thereto.

The first polarizing film 124 may be in contact with the first protective film 122. In the embodiment, the first polarizing film 124 may be located between a pair of the first protective films 122. The first polarizing film 124 may include poly vynyl alcohol (PVA). The first polarizing film 124 may include a dichromatic material in the PVA, which polarizes light to a particular direction.

The second polarizing plate 130 may be arranged on a second surface 110b of the liquid crystal panel 110. That is, the second polarizing plate 130 may be arranged to be in contact with the second surface 110b of the liquid crystal panel 110. The second surface 110b may be opposite to and correspond to the first surface 110a. For example, the first surface 110a of the liquid crystal panel 110 is directed toward the back of the display panel 100 while the second surface 110b of the liquid crystal panel 110 is directed toward the front of the display panel 100. The second polarizing plate 130 may include a second protective film 132 and a second polarizing film 134. There may be a pair of the second protective films 132 to protect the front and rear surfaces of the second polarizing film 134. The second protective film 132 may be formed of a durable and non-optical material. For example, the second protective film 132 may include at least one of TAC, PET, and acrylic films.

The second polarizing film 134 may be in contact with the second protective film 132. In the embodiment, the second polarizing film 134 may be located between the pair of the second protective films 132. The second polarizing film 134 may include PVA. The second polarizing film 134 may include a dichromatic material in the PVA, which polarizes light to a particular direction.

Light has a pair of electric field and magnetic field oscillating in different directions perpendicular to a traveling direction of light. The directions of oscillation of the electric and magnetic fields may be any different directions perpendicular to the traveling direction of light. The phenomenon that an electric field or a magnetic field oscillates in only a particular direction is called polarization, and a polarizer film may transmit light having an electric or magnetic field oscillating in a predetermined direction while blocking light having an electric or magnetic field oscillating in a direction other than the predetermined direction. The polarizing film transmits light oscillating in a predetermined direction but blocks light oscillating in the other directions.

The first polarizing film 124 may transmit light having an electric or magnetic field oscillating in a first direction while blocking other light. The second polarizing film 134 may transmit light having an electric or magnetic field oscillating in a second direction while blocking other light. The first and second directions may be perpendicular to each other. In other words, the direction in which the light transmitted through the first polarizing film 124 oscillates and the direction in which the light transmitted through the second polarizing film 134 oscillates may be perpendicular to each other. As a result, the light in general may not penetrate both the first and second polarizing films 124 and 134 at the same time.

The display panel 100 may further include a light absorbing layer 140. The light absorbing layer 140 may be arranged to receive the light having passed the liquid crystal panel 110 and the plurality of polarizing plates 120 and 130. The light emitted from the light source module 40 may pass the first polarizing plate 120, the liquid crystal panel 110, and the second polarizing plate 130, successively. Light passing the second polarizing plate 130 may be incident on the light absorbing layer 140. The light absorbing layer 140 may be arranged on the second polarizing plate 130 to absorb a portion of the light supplied from the BLU 20.

The light supplied from the light source module 40 may be diffused due to the difference in refractive index between the internal components of the display panel 100. This phenomenon may result in light leakage from the display panel 100, which interferes with expression of a desired color at a certain angle from the front of the display device 1. Light absorbers 170 may enhance the image quality of the display device 1 by absorbing the unnecessarily emitted light or reflecting it toward the front of the display device 1.

The light absorbing layer 140 may include a first resin layer 150, a second resin layer 160, and the light absorbers 170. The first and second resin layers 150 and 160 may include transparent resin capable of transmitting light. The first and second resin layers 150 and 160 may be formed to be as wide as the width of the second polarizing plate 130.

The first resin layer 150 may be arranged on the back surface of the second resin layer 160. The first and second resin layers 150 and 160 may have corresponding width to each other. The first resin layer 150 may have a refractive index lower than that of the second resin layer 160. Since the first and second resin layers 150 and 160 have optical surfaces parallel to the liquid crystal panel 110, the light may be inclined with respect to the front-back direction toward the front while traveling from the first resin layer 150 to the second resin layer 160. That is, the light may be directed to the front of the display device 1 while passing the first and second resin layers 150 and 160. The difference in refractive index n1 and n2 between the first and second resin layers 150 and 160 may be, for example, 0.1 or more.

The first resin layer 150 may include a first optical surface 152 directed to the second polarizing plate 130, and a second optical surface 154, on the opposite side of the first optical surface 152, coming into contact with the second resin layer 160. The first resin layer 150 may include a plurality of grooves 156 concavely formed on the first optical surface 152. The cross-section of the plurality of grooves 156 may have the form of trapezoids. However, embodiments are not limited thereto, and the cross-section of the plurality of grooves 156 may also have the form of triangles, rectangles, partial circles, half circles, ovals, or any combination thereof.

The light absorbers 170 may absorb a portion of the light passing the light absorbing layer 140. The light absorbers 170 may be provided in the first resin layer 150. Specifically, the light absorbers 170 may be arranged in the plurality grooves 156 formed on the first optical surface 152 of the first resin layer 150. The light absorbers 170 may be formed to fill the concave space of the plurality of grooves 156. The light absorbers 170 may be arranged to fill at least a part of each groove 156. For example, the light absorbers 170 may fully or partially fill each groove 156 according to the shape, size, purpose, etc., of the display device 1. Of the light incident on the light absorbing layer 140, some light inclined at more than a certain angle from a baseline extending in the front-back direction of the display panel 100 may be absorbed by the light absorbing layer 140. For example, of the light incident on the light absorbing layer 140, some light inclined at more than a certain angle from a baseline extending in the front-back direction of the display panel 100 may be absorbed by the light absorbers 170.

According to an embodiment, the plurality of grooves 156 may be formed on the second optical surface 154 of the first resin layer 150, and the light absorbers 170 may be arranged in the plurality of grooves 156 formed on the second optical surface 154. According to an embodiment, the light absorbers 170 may be arranged in the first resin layer 150 while not exposed through the first and second optical surfaces 152 and 154 and, the light absorbers 170 may be arranged in the first resin layer 150 to absorb a portion of the light passing the light absorbing layer 140.

The plurality of grooves 156 may be formed to have a cross-section with the length in the front-back direction being longer than the width in the left-right direction. This structure may more efficiently absorb a portion of the light incident on the light absorbing layer 140, which is inclined at more than a certain angle from the front-back direction of the display device 1. Consequently, the light incident on the light absorbing layer 140 may be mostly directed to the front of the display device 1.

The light absorbers 170 arranged in the plurality of grooves 156 may be elongated in one direction in the first resin layer 150 and may be arrayed in another direction perpendicular to the one direction, as shown in FIG. 4. In the embodiment, the light absorbers 170 are elongated in the longitudinal direction of the first resin layer 150 and arrayed in the lateral direction of the first resin layer 150. For example, referring to FIG. 4, the light absorbers 170 may be elongated in the vertical direction of the first resin layer 150 and arrayed in the horizontal direction of the first resin layer 150. In the embodiment, the light absorbers 170 may be arrayed regularly in the first resin layer 150. This may reduce or prevent the light inclined at more than a certain angle from a baseline extending in the front-back direction of the display panel 100 toward the left-right (or horizontal) direction of the display panel 100 from being emitted in the horizontal direction of the display panel 100.

To correspond to the optical absorbers 170 arranged in the first resin layer 150, the plurality of grooves 156 may be elongated in one direction on the first resin layer 150 and may be arrayed in another direction perpendicular to the one direction. In the embodiment, the plurality of grooves 156 may be elongated in the longitudinal direction of the first resin layer 150 and arrayed in the lateral direction of the first resin layer 150. That is, the plurality of grooves 156 may be elongated in the vertical direction of the first resin layer 150 and arrayed in the horizontal direction of the first resin layer 150.

The plurality of grooves 156 may be arranged regularly on the first resin layer 150. The plurality of grooves 156 may include a first groove 156aa, a second groove 156bb separated by first length L1 from the first groove 156aa, and a third groove 156cc separated by second length L2 from the second groove 156bb. In the embodiment, the first length L1 may be the same as the second length L2, and the plurality of grooves 156 may be arranged at regular intervals on the first resin layer 150.

Since the light passing the liquid crystal panel 110 is absorbed or reflected while passing the liquid crystal panel 110, a portion of the light inclined at less than a certain angle from a baseline extending in the front-back direction of the display panel 100 may be emitted. Subsequently, the light emitted from the first resin layer 150 may be further refracted toward the front while being incident on the second resin layer 160.

The light absorbers 170 may include, for example, at least one of carbon black, black resin, a compound of metal particles, graphite power, gravure ink, black spray, and black enamel.

The shape of the cross-section of the optical absorbers 170 may correspond to the cross-sectional feature of the plurality of grooves 156. The cross-sectional features of the light absorbers 170 and the plurality of grooves 156 may have the form of trapezoids whose width becomes smaller along the depth. When the width and the height of the cross-section of each of the light absorbers 170 are La and Lb, and the gap between the neighboring light absorbers 170 are Lc, they may be defined as follows:

5 μm≤La≤20 μm
10 μm≤Lb≤40 μm
15 μm≤Lc≤50 μm

While La, Lb, and Lc are defined when the cross-section of each light absorber 170 has the form of a trapezoid in the embodiment, the light absorbers 170 may have any other forms as long as the above relations are met. La, Lb, and Lc may also refer to the width and the height of the cross-section of each of the plurality of grooves 156 and the gap between the neighboring grooves 156.

The display panel 100 may further include an adhesive layer 180.

The adhesive layer 180 may be arranged between the light absorbing layer 140 and the second polarizing plate 130. The adhesive layer 180 may be provided for the light absorbing layer 140 to be adhered to the second polarizing plate 130. That is, the adhesive layer 180 may be arranged between the light absorbing layer 140 and the second polarizing plate 130 such that the light absorbing layer 140 and the second polarizing plate 130 are bonded together. The adhesive layer 180 may have a refractive index, which is the same as or less than the refractive index of the first resin layer 150. In other words, the adhesive layer 180 may have a refractive index, which is the same as or less than the refractive index of the first resin layer 150, to reduce or prevent the adhesive layer 180 from causing the light emitted from the second polarizing plate 130 to have a large angle of emission.

The display panel 100 may further include the protective film 190 applied on the front surface of the light absorbing layer 140. The protective film 190 may be provided to come into contact with the outer surface of the second resin layer 160 of the light absorbing layer 140. The protective film 190 may include at least one of TAC, PET, and acrylic films. The display panel 100 may include a surface layer 192 applied onto the front surface of the protective film 190. In other words, the surface layer 192 may be arranged on the outer surface of the protective film 190.

The light absorbing layer 140 may be manufactured in a module and adhered to the second polarizing plate 130. For example, the first polarizing plate 120, the second polarizing plate 130, the liquid crystal panel 110, and the light absorbing layer 140 may be separately manufactured and then combined together.

To manufacture the light absorbing layer 140, the first resin layer 150 may be layered on the second resin layer 160. A plurality of grooves 156 may then be formed on the first resin layer 150, and the light absorbers 170 may be injected or inserted to the plurality of grooves 156. The light absorbing layer 140 manufactured in this way may be adhered to a surface of the second polarizing plate 130 through the adhesive layer 180.

The protective film 190 or the surface layer 192 arranged in front of the light absorbing layer 140 may be layered on the light absorbing layer 140 after the light absorbing layer 140 is adhered to the second polarizing plate 130. The method of manufacturing the light absorbing layer 140 is not, however, limited thereto, and may vary. For example, the light absorbing layer 140 may be manufactured in a module such that the second resin layer 160 is arranged at the bottom of the light absorbing layer 140.

Figure 5:
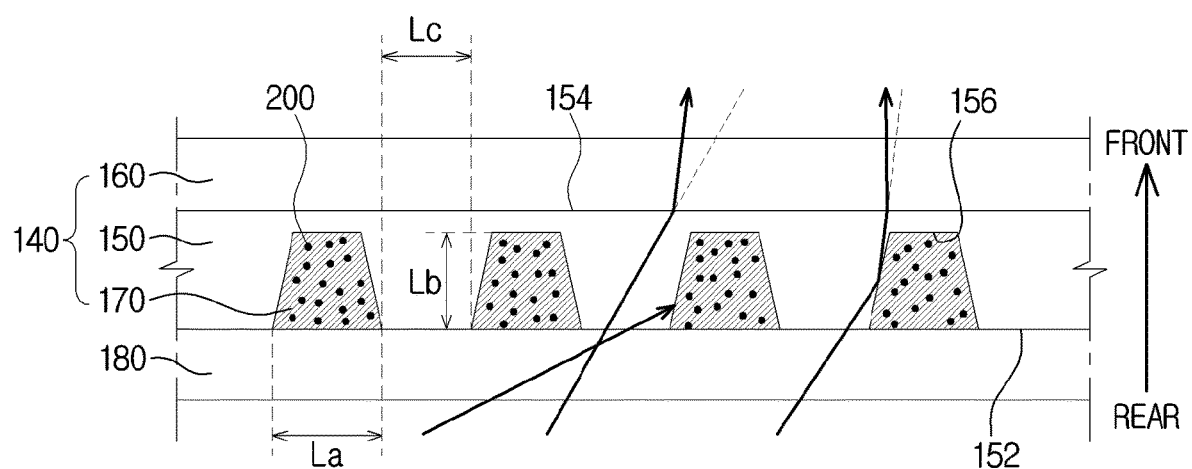
FIGS. 5 to 11 show a display device having different display panels, each having a different array of a light absorbing material, according to an embodiment.
Figure 6:
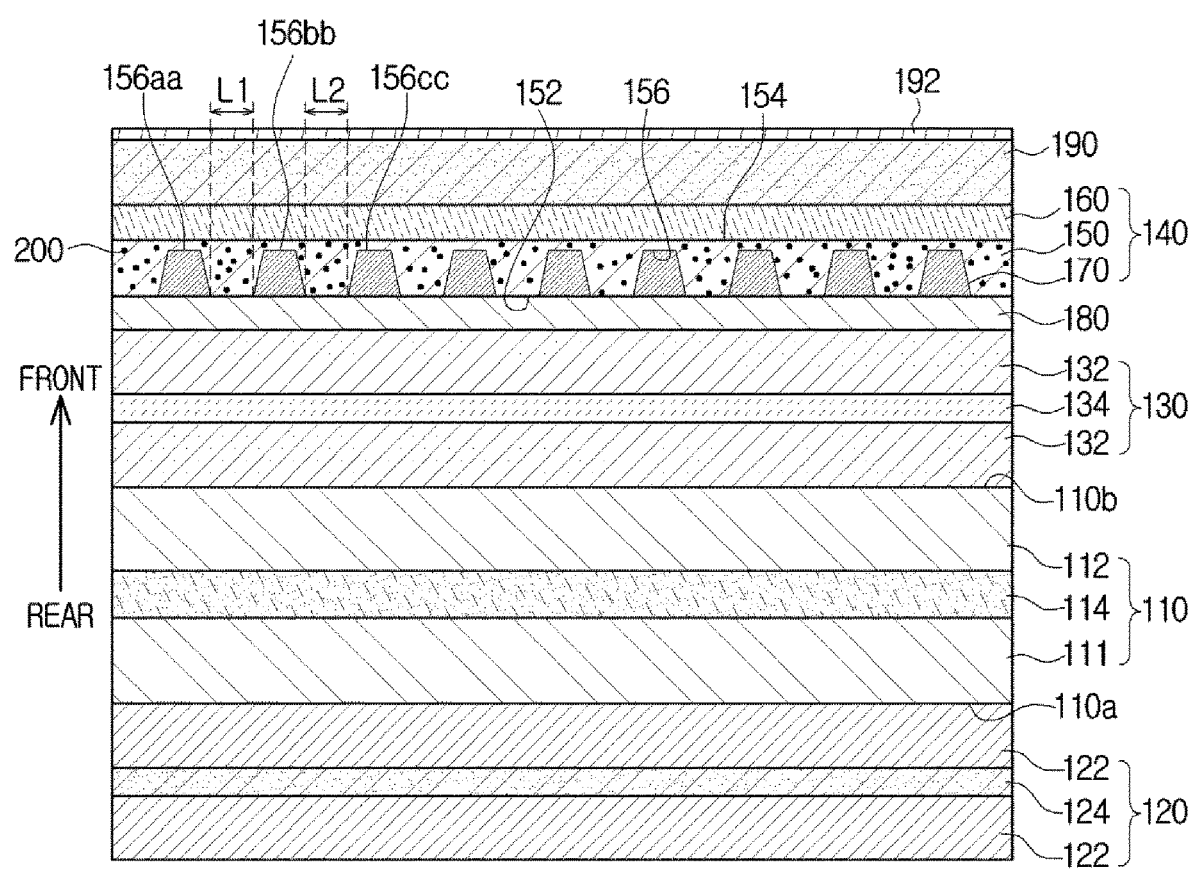
Figure 7:
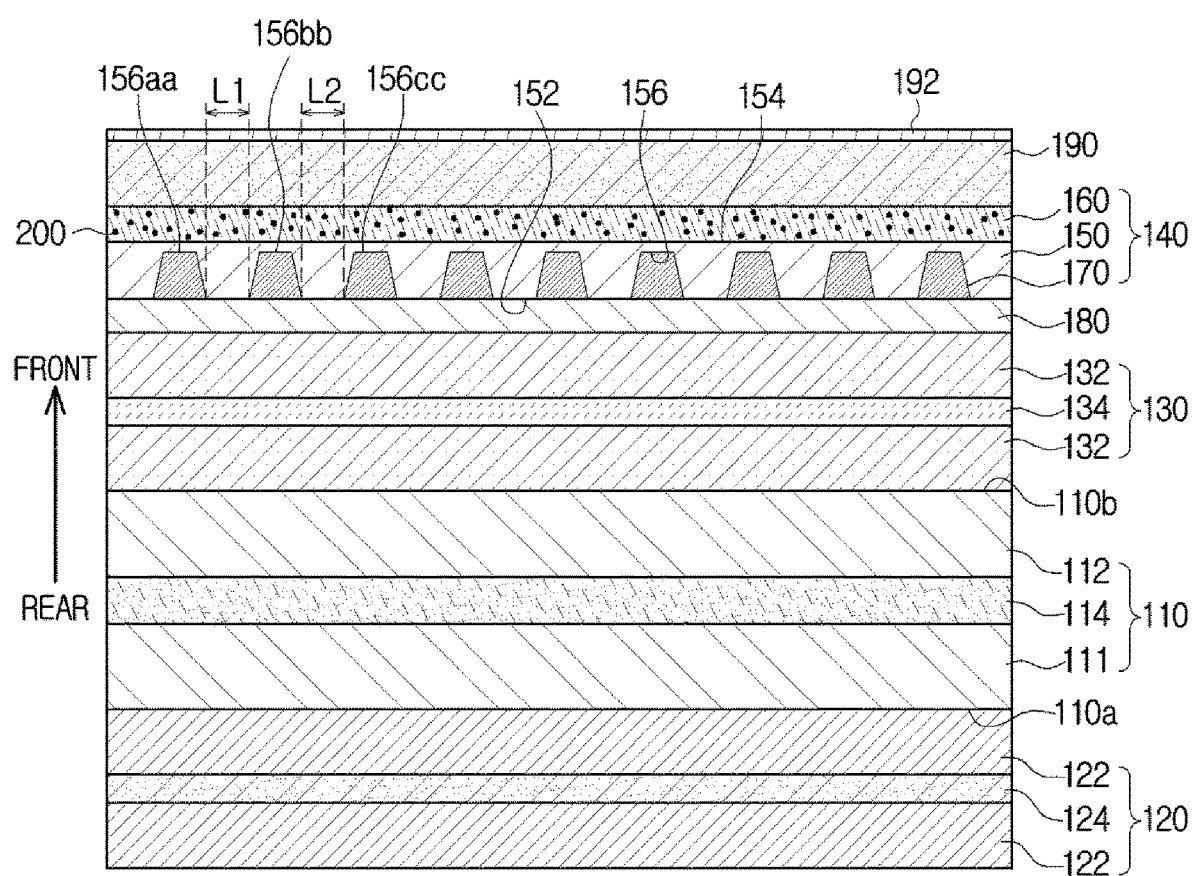
Figure 8:
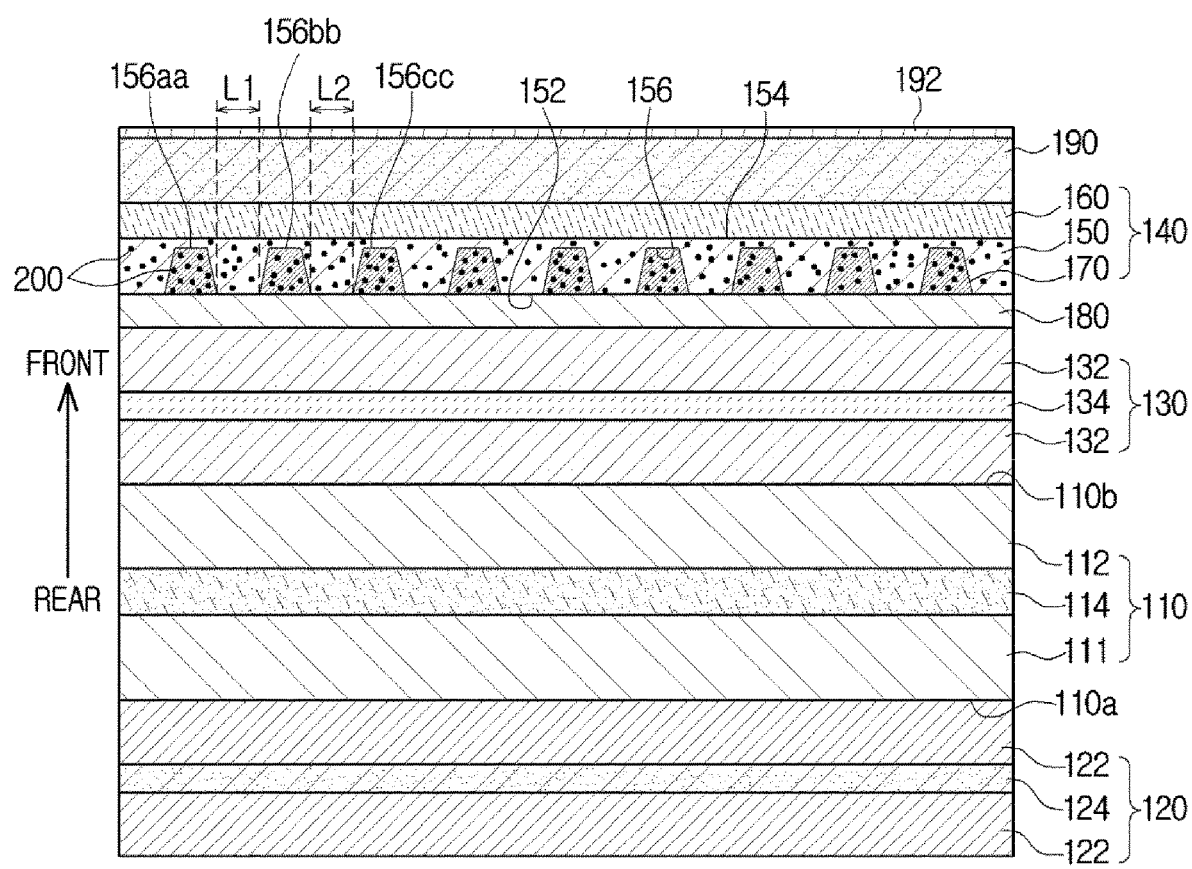
Figure 9:
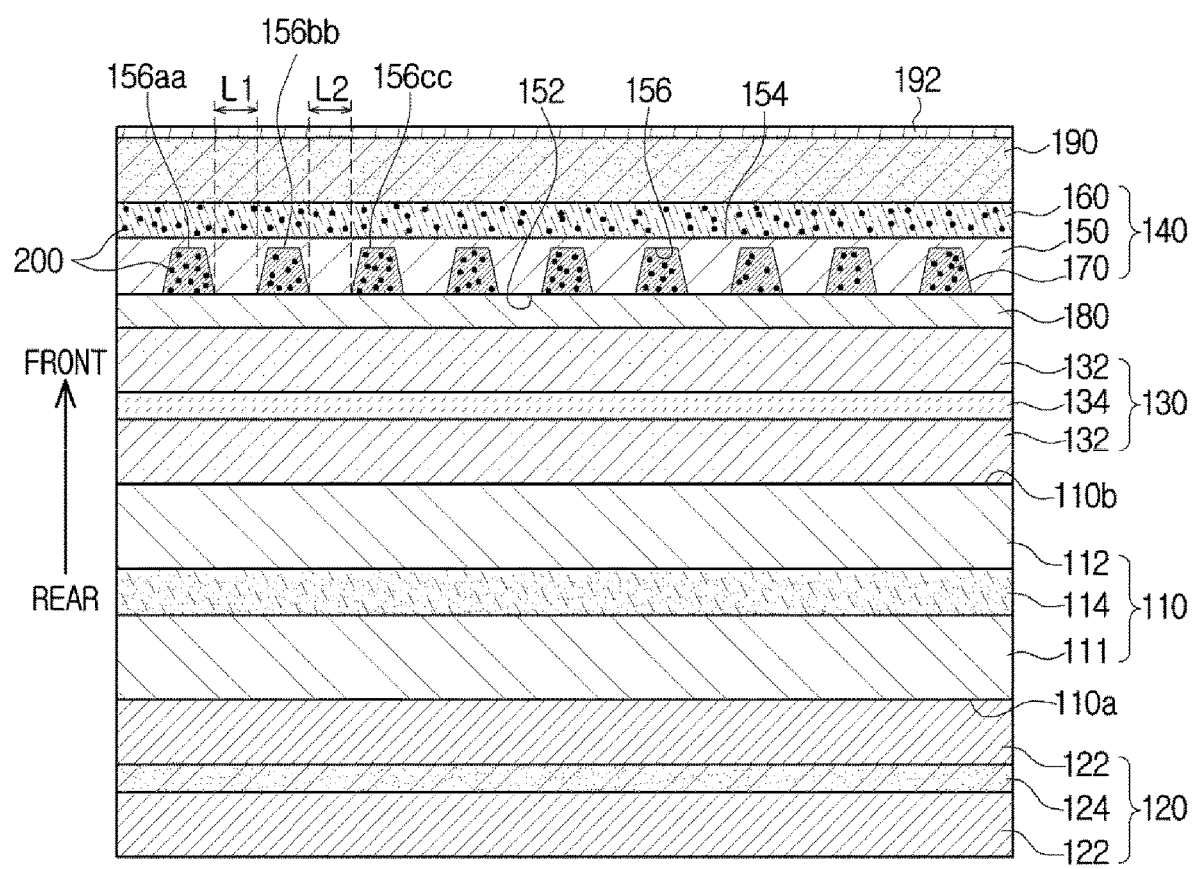
Figure 10:
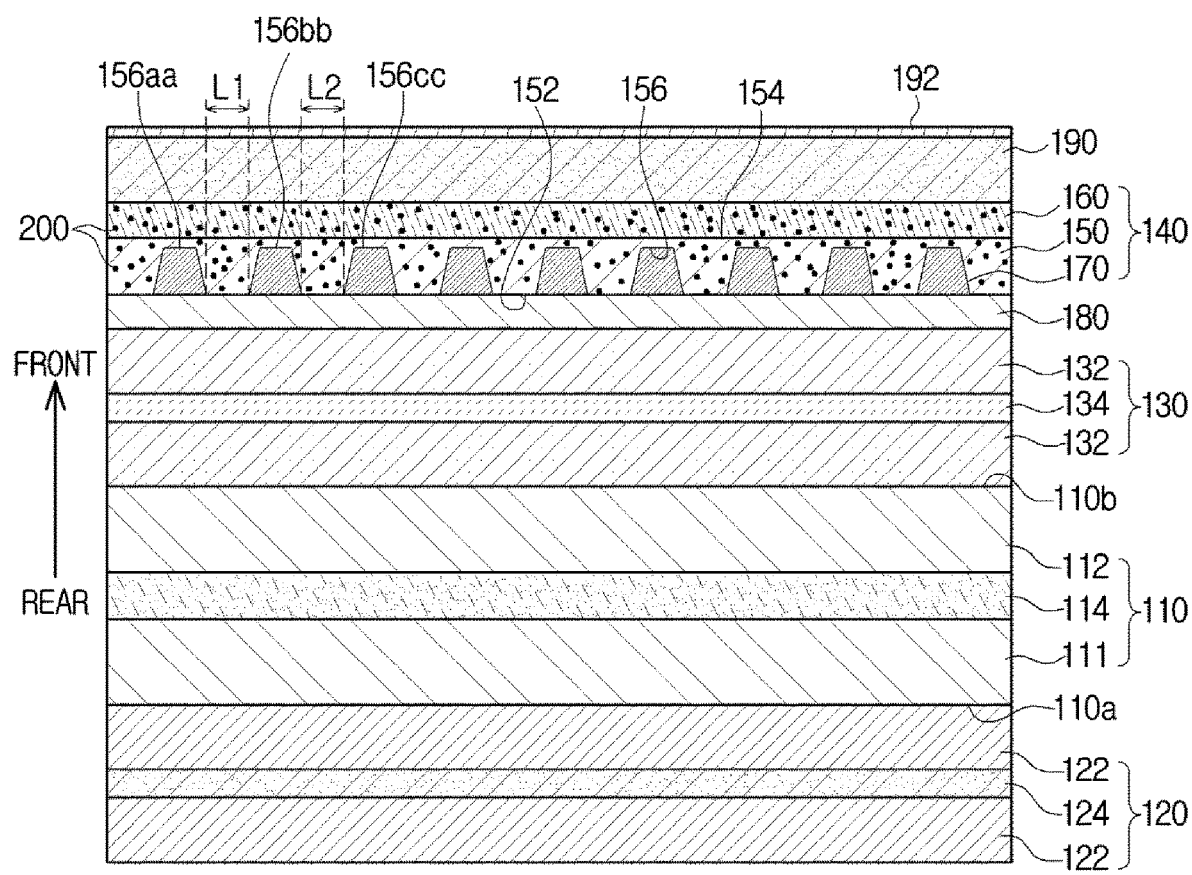
Figure 11:
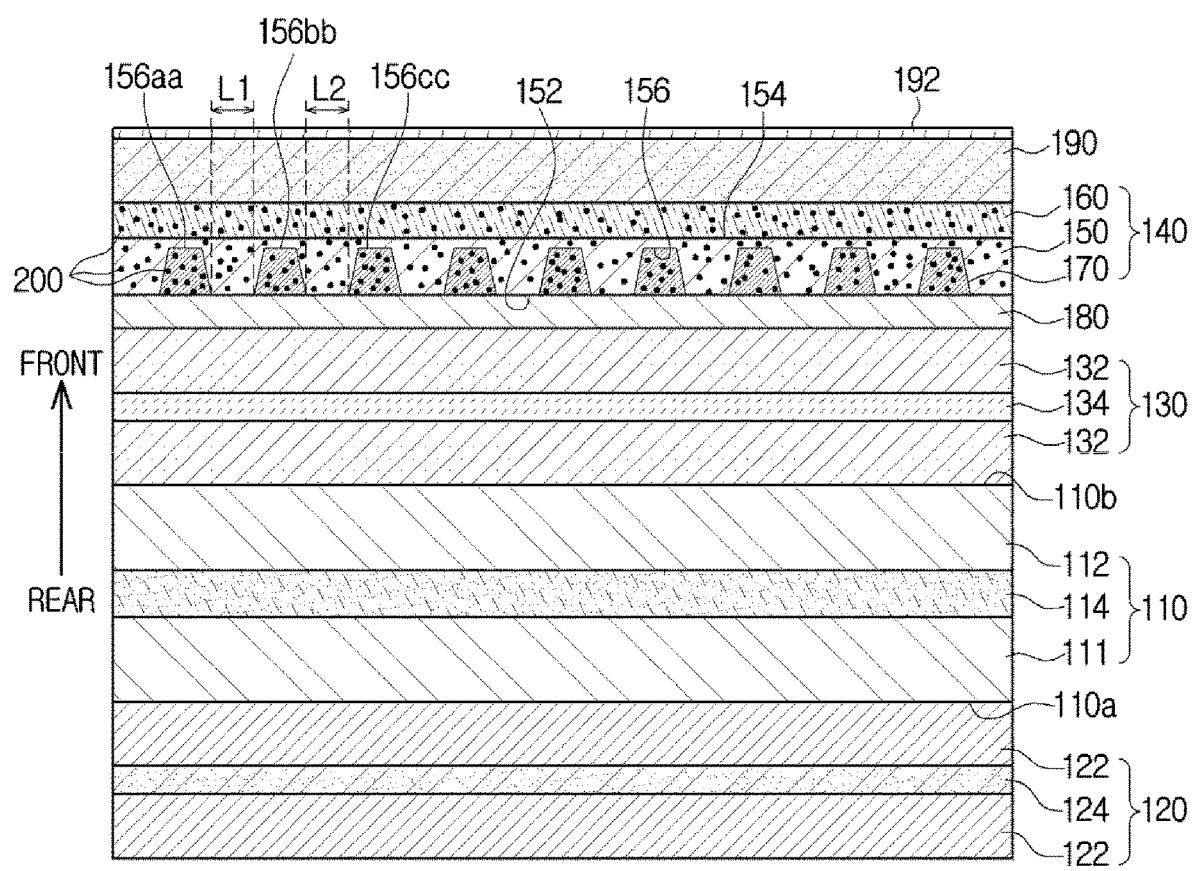

The display panel 100 may further include a light absorbing material 200 contained in the light absorbing layer 140 to absorb light of particular wavelengths. For example, the light absorbing material 200 may be contained in at least one from among the first resin layer 150, the second resin layer 160, and the light absorbers 170. FIG. 5 shows an example that the light absorbing material 200 is contained in the light absorbers 170. FIG. 5 shows a case where the light absorbing material 200 is included in the plurality of grooves 156 along with the light absorbers 170. FIG. 6 shows an example that the light absorbing material 200 is contained in the first resin layer 150, and FIG. 7 shows an example that the light absorbing material 200 is contained in the second resin layer 160. FIG. 8 shows an example that the light absorbing material 200 is contained in the light absorbers 170 and the first resin layer 150, and FIG. 9 shows an example that the light absorbing material 200 is contained in the light absorbers 170 and the second resin layer 160. FIG. 10 shows an example that the light absorbing material 200 is contained in the first and second resin layers 150 and 160, and FIG. 11 shows an example that the light absorbing material 200 is contained in the first and second resin layers 150 and 160 and the light absorbers 170.

The light absorbing material 200 may include at least one pigment that absorbs light of particular wavelengths.

As described above, the light absorbers 170 may absorb or reflect the unnecessarily emitted light toward the front of the display panel 100, thereby enhancing the image quality of the display device 1. The light absorbing material 200 may further enhance the image quality of the display device 1 by supplementing the role of the light absorbers 170. The light absorbing material 200 may be additionally applied when it is difficult to realize the display device 1 with uniform brightness even with the light absorbers 170. The light absorbing material 200 may be applied to reduce or prevent occurrence of mura like a stain on the screen of the display device 1. The light absorbing material 200 may help to enhance color reproducibility and uniformity of brightness of the display device 1 by absorbing the unnecessarily emitted light of particular wavelengths.

Figure 12:
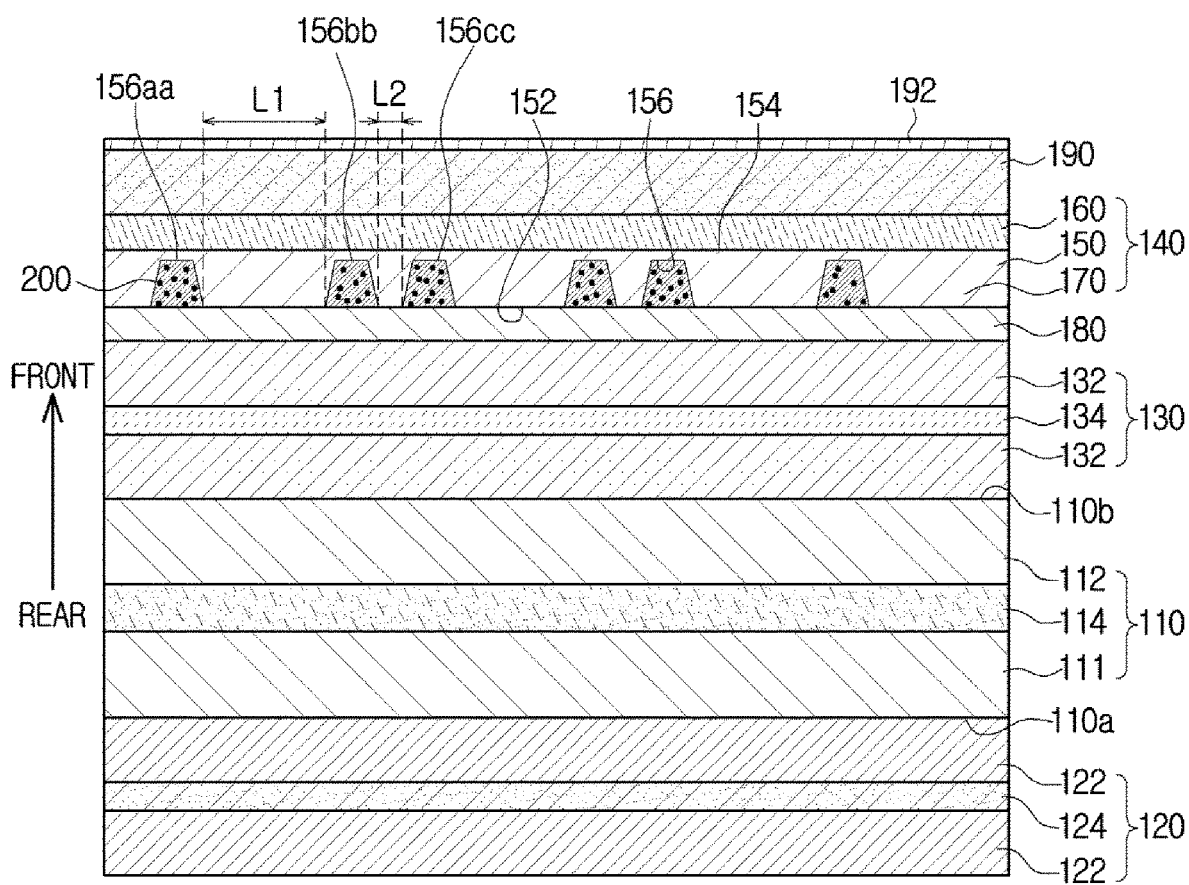
FIG. 12 is a cross-sectional view of a display panel of a display device according to an embodiment.

FIG. 12 is a cross-sectional view of a display panel of a display device, according to an embodiment of the present disclosure. In FIG. 12, reference numeral 200 represents the light absorbing material.

The plurality of grooves 156 may include the first groove 156*aa*, the second groove 156*bb* separated by the first length L1 from the first groove 156*aa*, and the third groove 156*cc* separated by the second length L2 from the second groove 156*bb*. The first length L1 may be different from the second length L2. The gap between the neighboring grooves 156 may vary depending on the arrangement of the light source module 40, internal configurations of the optical sheet 50 or the display panel 100.

FIGS. 13 to 17 are cross-sectional views of a display panel of a display device according to an embodiment. In FIGS. 13 to 17, reference numeral 200 represents the light absorbing material.

Figure 13:
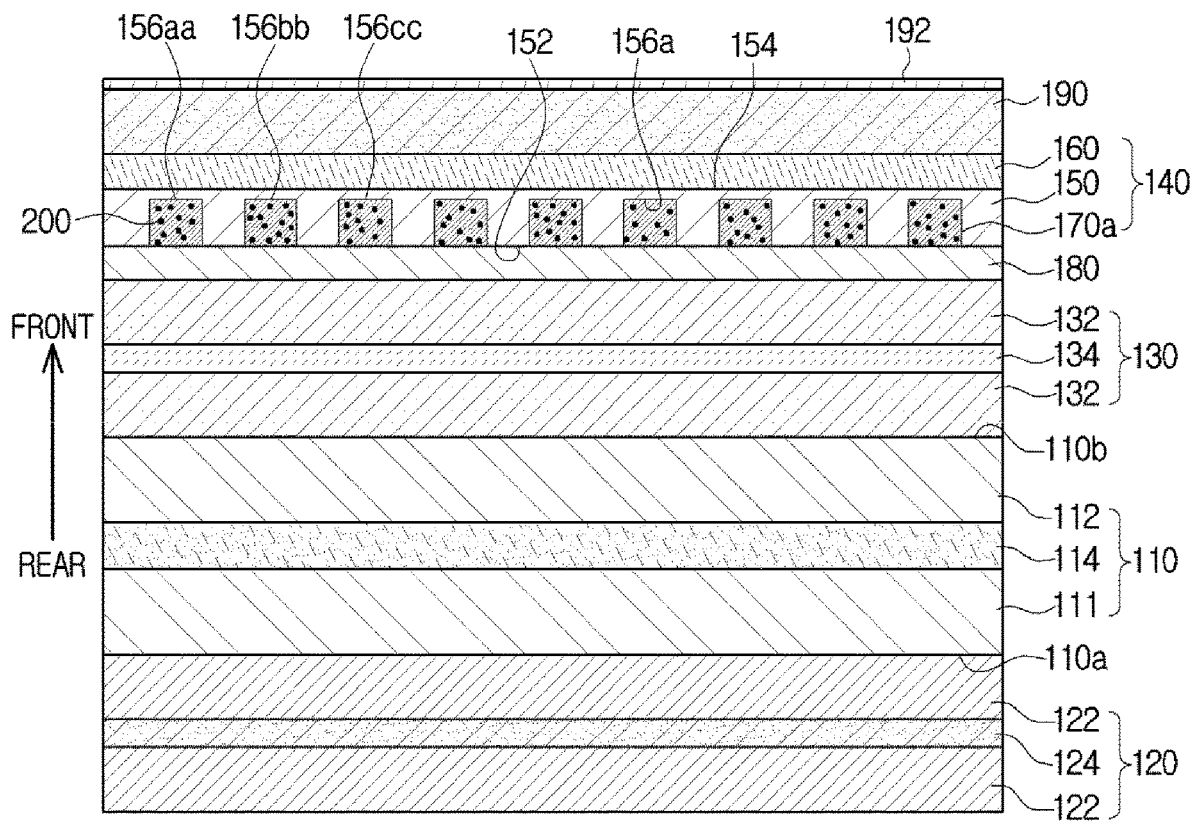
FIGS. 13 to 17 are cross-sectional views of a display panel of a display device according to an embodiment.

As shown in FIG. 13, the first resin layer 150 may include a plurality of grooves 156*a* concavely formed thereon. The plurality of grooves 156*a* may have the form of squares. Accordingly, light absorbers 170*a* filling the concave space formed in the plurality of grooves 156*a* may also have the form of squares.

Figure 14:
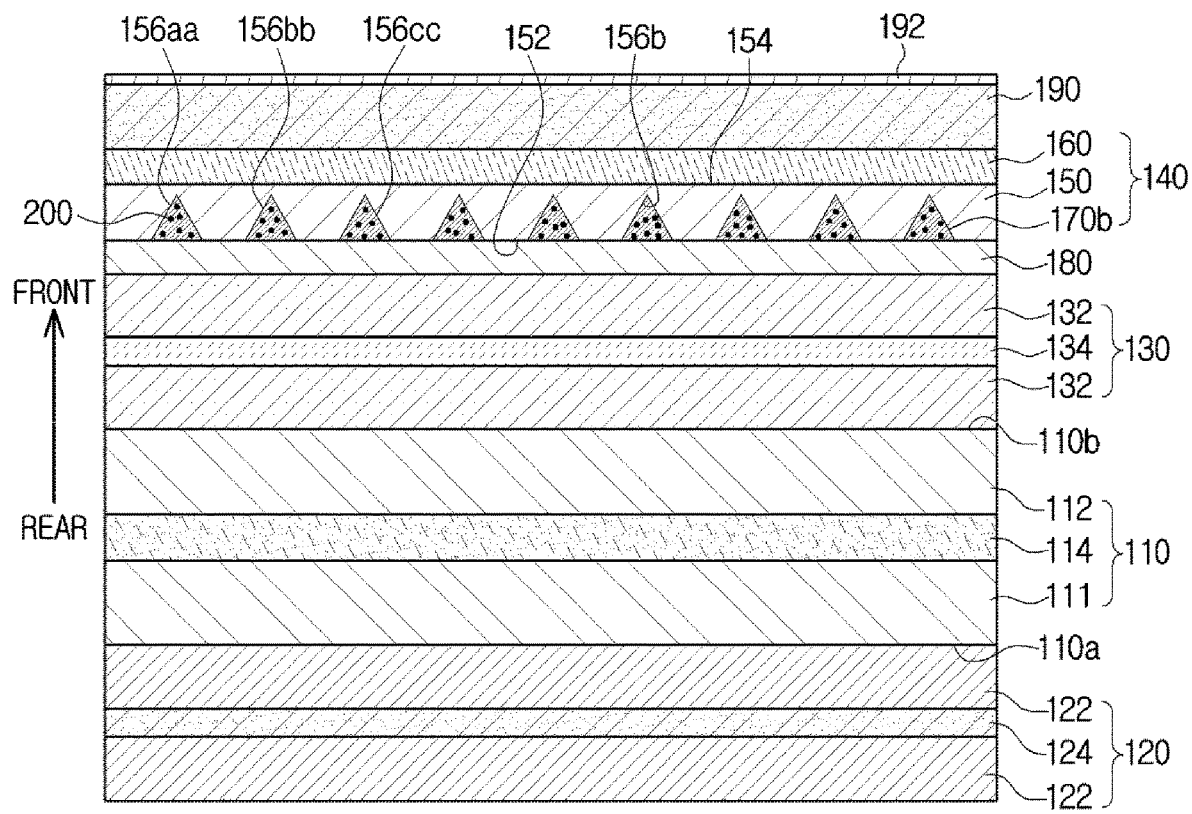

Referring to FIG. 14, a plurality of grooves 156*b* may have the form of triangles. Accordingly, light absorbers 170*b* filling the concave space formed in the plurality of grooves 156*b* may also have the form of triangles.

Figure 15:
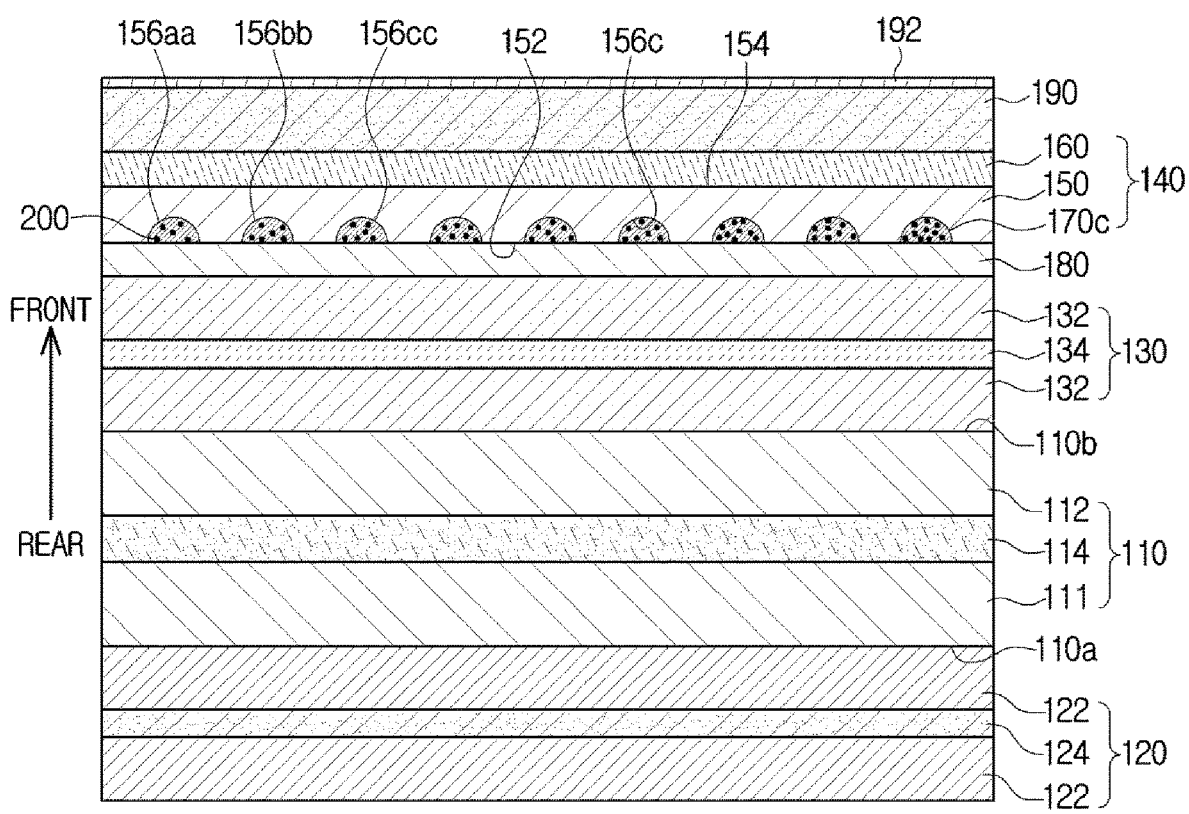

Referring to FIG. 15, a plurality of grooves 156*c* may have the form of semicircles. Accordingly, light absorbers 170*c* filling the concave space formed in the plurality of grooves 156*c* may also have the form of semicircles.

Figure 16:
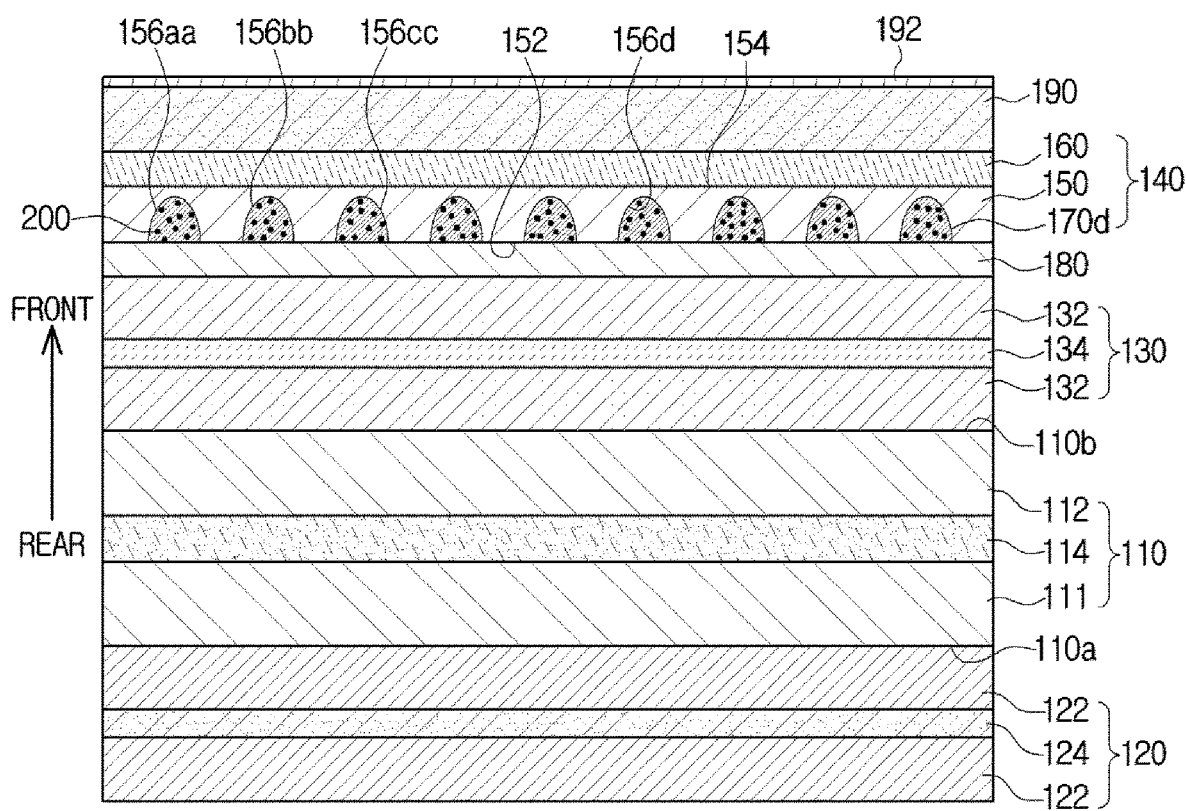

Referring to FIG. 16, a plurality of grooves 156*d* may have the form of full or partial ellipses. Accordingly, light absorbers 170*d* filling the concave space formed in the plurality of grooves 156*d* may also have the form of full or partial ellipses.

Figure 17:
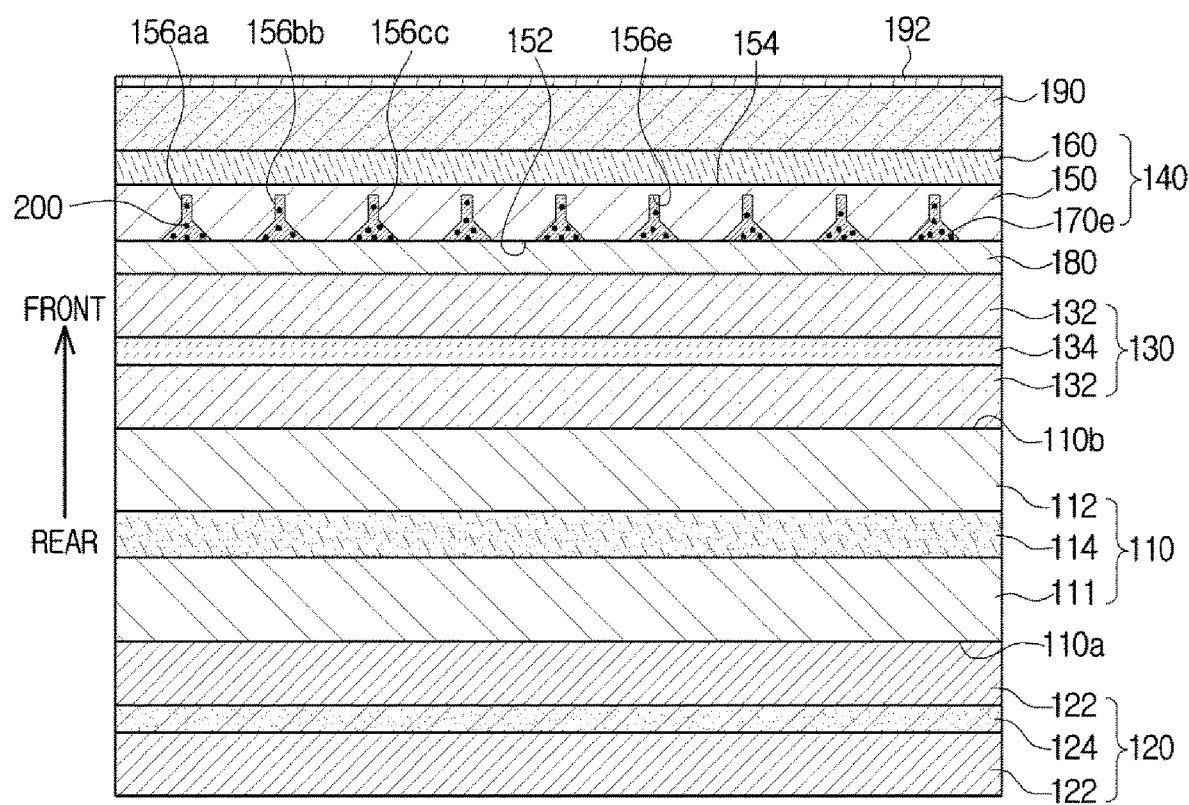

Referring to FIG. 17, a plurality of grooves 156*e* may have the combined form of the aforementioned figures. For example, as shown in FIG. 17, the plurality of grooves 156*e* may have the combined form of triangle and square. Accordingly, light absorbers 170*e* filling the concave space formed in the plurality of grooves 156*e* may also have the combined form of triangle and square.

FIGS. 18 to 23 are perspective views of a first resin layer of a display device according to an embodiment.

Figure 18:
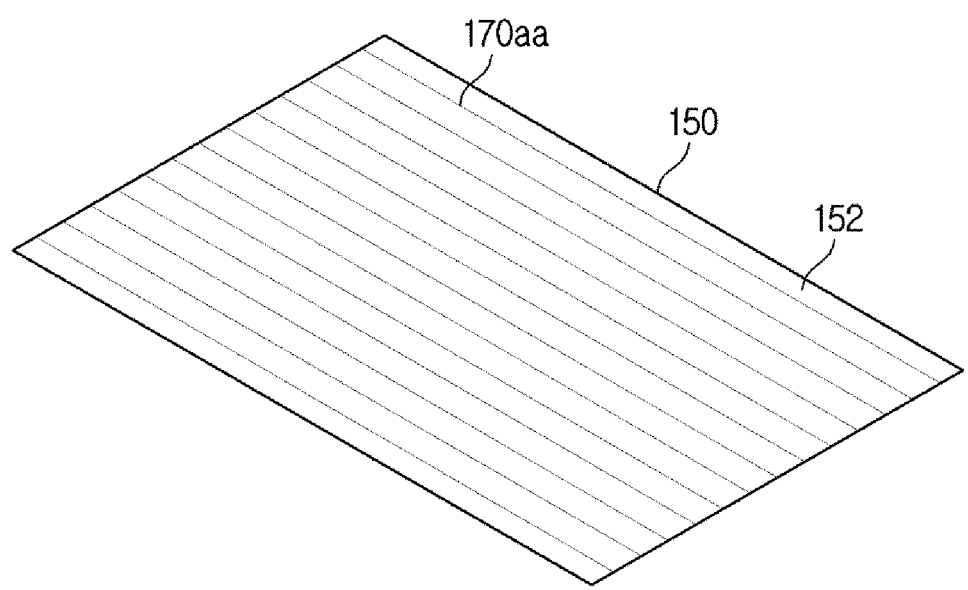
FIGS. 18 to 23 are perspective views of a first resin layer of a display device according to an embodiment.

Referring to FIG. 18, a plurality of grooves filled with light absorbers 170*aa* may be arrayed on the first resin layer 150. The light absorbers 170*aa* filling the plurality of grooves are elongated in the horizontal direction of the display panel 100 and arrayed in the vertical direction. The light absorbers 170*aa* may be arrayed regularly in the first resin layer 150. This may reduce or prevent the light inclined at more than a certain angle from a baseline extending in the front-back direction of the display panel 100 toward the vertical direction of the display panel 100 from being emitted in the vertical direction of the display panel 100.

Figure 19:
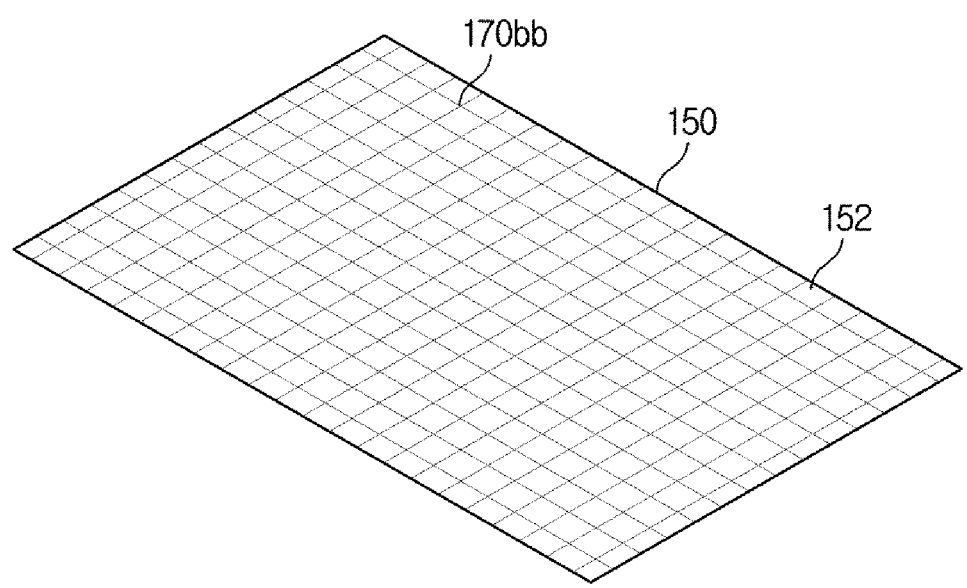

Referring to FIG. 19, a plurality of light absorbers 170*bb* filling a plurality of grooves are elongated to cross each other in the horizontal and vertical directions of the display panel 100, and arrayed in the vertical and horizontal directions. The light absorbers 170*bb* may be arrayed in the first resin layer 150. The light absorbers 170*bb* may be arrayed regularly in the first resin layer 150. This may reduce or prevent the light from being emitted while being inclined at more than a certain angle from the vertical and horizontal directions.

Figure 20:
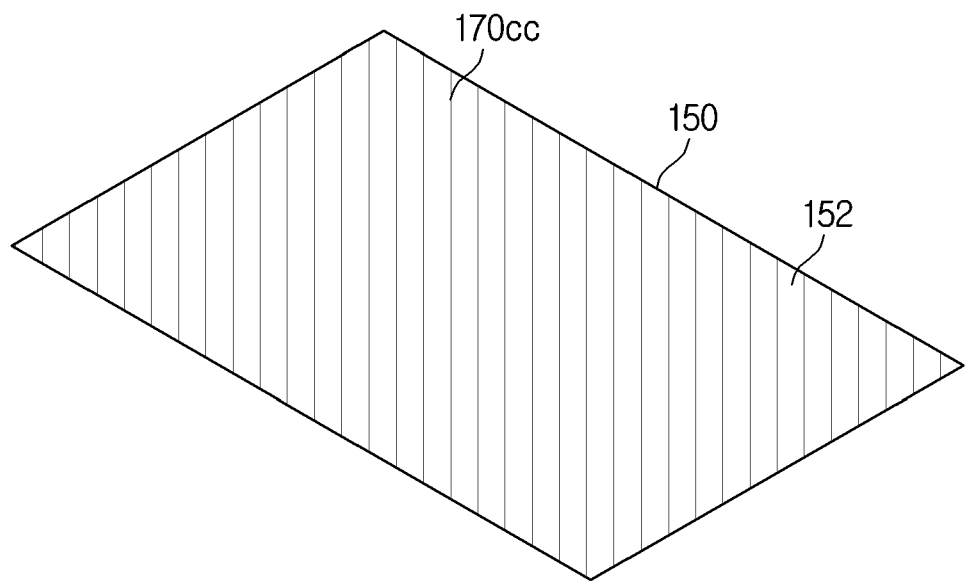

Referring to FIG. 20, a plurality of light absorbers 170*cc* filling a plurality of grooves are elongated in the diagonal direction of the display panel 100, and arrayed in a direction perpendicular to the diagonal direction. The light absorbers 170*cc* may be arrayed in the first resin layer 150. The light absorbers 170*cc* may be arrayed regularly in the first resin layer 150. This may reduce or prevent the light from being emitted while being inclined at more than a certain angle from the front of the display panel 100 toward the direction perpendicular to the diagonal direction.

Figure 21:
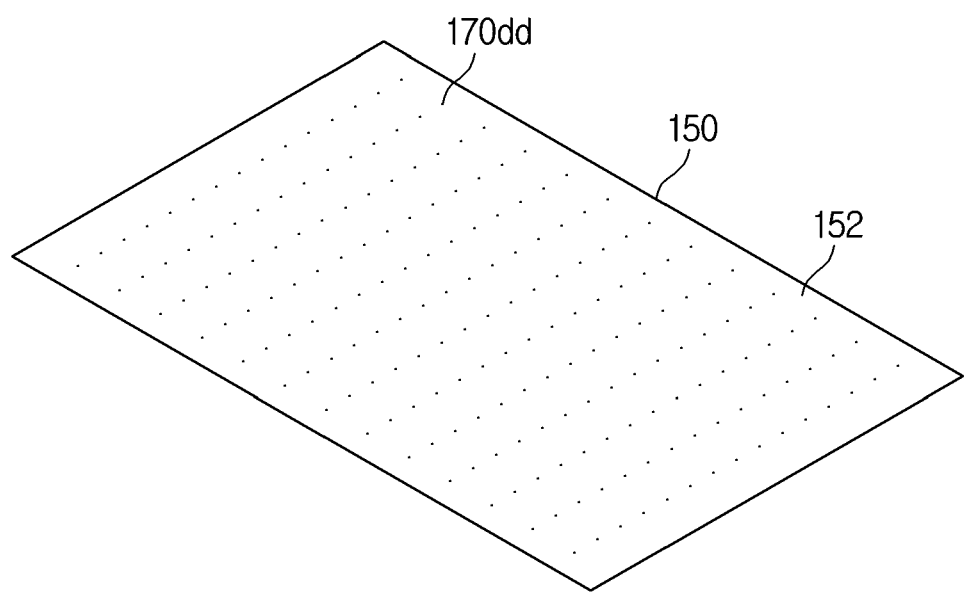

Referring to FIG. 21, light absorbers 170dd filling a plurality of grooves may have the form of dots and distributed in the first resin layer 150. The light absorbers 170dd may be distributed uniformly as shown in FIG. 21, or may be more densely distributed in a certain area.

Figure 22:
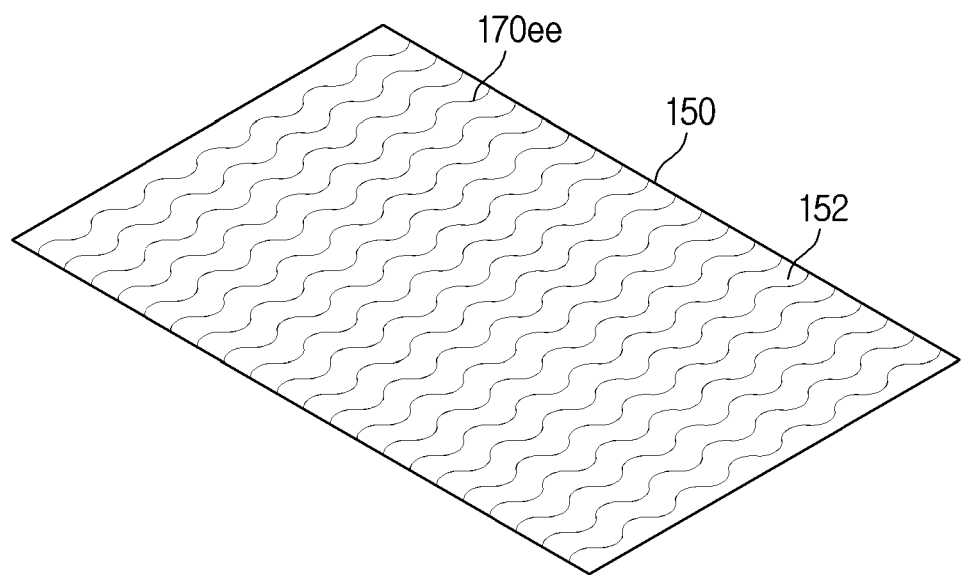

Referring to FIG. 22, a plurality of light absorbers 170ee filling a plurality of grooves may have the form of waves traveling in one direction, and arrayed in a direction perpendicular to the one direction. The light absorbers 170ee may be arrayed regularly in the first resin layer 150. This may reduce or prevent the light from being emitted while being inclined at more than a certain angle from the vertical and horizontal directions of the display panel 100.

Figure 23:
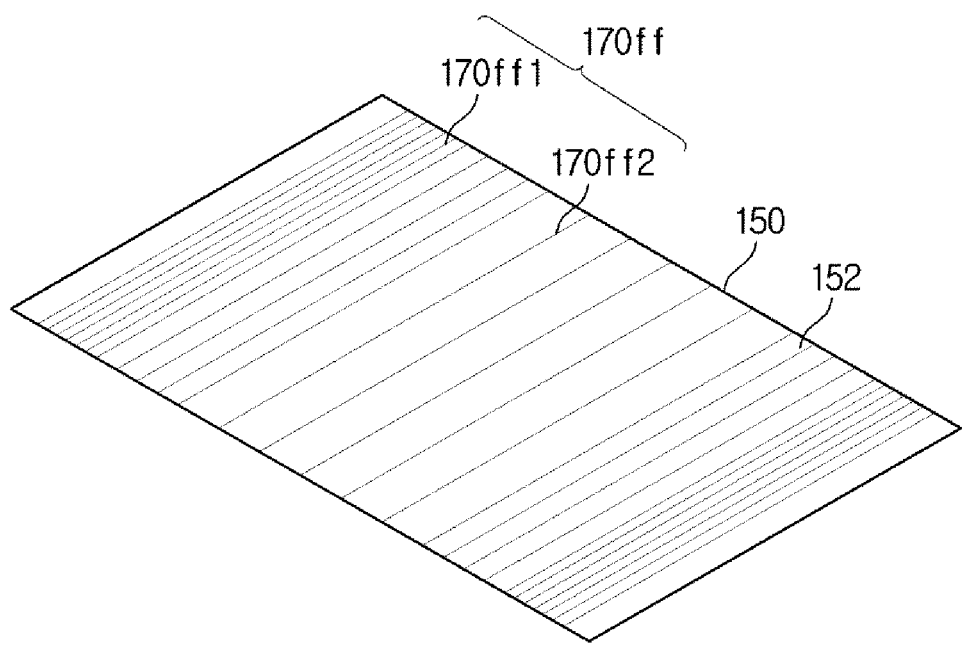

Referring to FIG. 23, a plurality of light absorbers 170ff filling a plurality of grooves may be arrayed in the first resin layer 150 with different densities of intervals depending on the areas. The light absorbers 170ff may include first light absorbers 177ff1 arrayed in first areas and second light absorbers 177ff2 arrayed in second areas. The first light absorbers 177ff1 may be arrayed more densely than the second light absorbers 177ff2. While the first areas are on the left and right sides in the embodiment, they are not limited thereto.

According to embodiments, the light absorbing material 200 may be applied to the display panel of as shown in FIG. 3. However, embodiments are not limited thereto, and the light absorbing material 200 may be applied to the display panels of FIGS. 12 to 17.

According to embodiments, a display device may be obtained, which may reduce or prevent mura that looks like a stain, by adding a light absorbing material that absorbs light in a particular wavelength range to a light absorbing layer, thereby enhancing uniformity of brightness and color reproducibility and facilitating realization of black screens.

While one or more embodiments have been described with reference to the figures, it will be understood by those of ordinary skill in the art that various changes in form and details may be made therein without departing from the spirit and scope as defined by the following claims.

What is claimed is:

1. A display device comprising:
a display panel; and
a backlight unit configured to supply light to the display panel,
wherein the display panel comprises:
a liquid crystal panel comprising a first surface and a second surface that is opposite to the first surface;
a first polarizing plate provided on the first surface of the liquid crystal panel;
a second polarizing plate provided on the second surface of the liquid crystal panel;
a light absorbing layer provided on the second polarizing plate, the light absorbing layer being configured to absorb a portion of the light supplied from the backlight unit; and
an adhesion layer provided between the light absorbing layer and the second polarizing plate and configured to bond the light absorbing layer and the second polarizing plate,
wherein the liquid crystal panel is provided between the light absorbing layer and the backlight unit,
wherein the light absorbing layer further comprises:
a first resin layer;
a second resin layer having a refractive index that is higher than a refractive index of the first resin layer; and
light absorbers provided on the first resin layer and configured to absorb a portion of light passing the light absorbing layer, and
light absorbing particles configured to absorb light of predetermined wavelengths, the light absorbing particles being included in the first resin layer and outside of the light absorbers, and
wherein the adhesion layer has a refractive index lower than the refractive index of the first resin layer.

2. The display device of claim 1, wherein the first resin layer comprises:
an optical surface facing the second polarizing plate; and
a plurality of grooves provided on the optical surface, and
wherein the light absorbers are provided in the plurality of grooves and fill at least a part of each of the plurality of grooves.

3. The display device of claim 1, wherein the light absorbers comprise black resin.

4. The display device of claim 1, wherein the light absorbers comprise at least one of carbon black, graphite powder, gravure ink, black spray, and black enamel.

5. The display device of claim 1, wherein the light absorbing particles comprises at least one pigment configured to absorb the light of the predetermined wavelengths.

6. A display device comprising:
a display panel; and
a backlight unit configured to supply light to the display panel,
wherein the display panel comprises
a liquid crystal panel comprising a first surface and a second surface that is opposite to the first surface;
a first polarizing plate provided on the first surface of the liquid crystal panel;
a second polarizing plate provided on the second surface of the liquid crystal panel;
a light absorbing layer provided on the second polarizing plate; and
an adhesion layer provided between the light absorbing layer and the second polarizing plate and configured to bond the light absorbing layer and the second polarizing plate, the light absorbing layer comprising:
a first resin layer;
a second resin layer having a refractive index that is different than a refractive index of the first resin layer; and
light absorbers provided on the first resin layer and configured to absorb a portion of light passing the light absorbing layer; and
light absorbing particles included in the second resin layer, and configured to absorb light of predetermined wavelengths,
wherein the liquid crystal panel is provided between the light absorbing layer and the backlight unit, and
wherein the adhesion layer has a refractive index lower than the refractive index of the first resin layer.

7. The display device of claim 6, wherein the refractive index of the first resin layer is lower than the refractive index of the second resin layer.

8. The display device of claim 6, wherein the first resin layer comprises:
an optical surface facing the second polarizing plate; and
a plurality of grooves provided on the optical surface, and
wherein the light absorbers are provided in the plurality of grooves and fill at least part of each of the plurality of grooves.

9. The display device of claim 6, wherein the light absorbers comprise black resin.

10. The display device of claim 6, wherein the light absorbers comprise at least one of carbon black, graphite powder, gravure ink, black spray, and black enamel.

11. The display device of claim 6, wherein the light absorbing particles comprises at least one pigment configured to absorb the light of the predetermined wavelengths.

12. A display device comprising:
a display panel; and
a backlight unit configured to supply light to the display panel,
wherein the display panel comprises:
 a liquid crystal panel;
 a first polarizing plate provided on the liquid crystal panel;
 a second polarizing plate provided on the liquid crystal panel opposite to the first polarizing plate;
 a light absorbing layer provided on the second polarizing plate, the light absorbing layer being configured to absorb light inclined at more than a predetermined angle from a baseline extending in a front-back direction of a surface of the display panel among light incident on the light absorbing layer; and
 an adhesion layer provided between the light absorbing layer and the second polarizing plate and configured to bond the light absorbing layer and the second polarizing plate,
wherein the liquid crystal panel is provided between the light absorbing layer and the backlight unit,
wherein the light absorbing layer further comprises:
 a first resin layer;
 a second resin layer having a refractive index that is higher than a refractive index of the first resin layer; and
 light absorbers provided on the first resin layer and configured to absorb a portion of light passing the light absorbing layer, and
 light absorbing particles configured to absorb light of predetermined wavelengths, the light absorbing particles being included in the first resin layer and the light absorbers, and
wherein the adhesion layer has a refractive index lower than the refractive index of the first resin layer.

13. The display device of claim 12, wherein the first resin layer comprises
 an optical surface provided on the second polarizing plate; and
 a plurality of grooves provided on the optical surface, and
wherein the light absorbers are provided in the plurality of grooves and fill at least part of each groove.

14. The display device of claim 12, wherein the light absorbers comprise at least one of carbon black, graphite powder, gravure ink, black spray, and black enamel.

15. The display device of claim 12, wherein the light absorbing particles comprise at least one pigment configured to absorb the light of the predetermined wavelengths.

* * * * *